United States Patent [19]

Frank

[11] 4,103,287

[45] Jul. 25, 1978

[54] VARIABLE LENGTH CODES FOR HIGH QUALITY IMAGE ENCODING

[75] Inventor: Amalie Julianna Frank, Chatham Township, Morris County, N.J.

[73] Assignee: Bell Telephone Laboratories, Incorporated, Murray Hill, N.J.

[21] Appl. No.: 425,506

[22] Filed: Dec. 17, 1973

[51] Int. Cl.² .............................................. G06K 9/00
[52] U.S. Cl. .................. 340/146.3 H; 340/146.3 AC; 358/260
[58] Field of Search ................................ 178/DIG. 3; 340/146.3 H, 146.3 AC; 358/260, 261, 262

[56] References Cited

U.S. PATENT DOCUMENTS

| 3,347,981 | 10/1967 | Kagan et al. | 340/146.3 H |
| 3,686,631 | 8/1972 | Elliott | 340/146.3 H |

OTHER PUBLICATIONS

Grimsdale et al., "A System for the Automatic Recognition of Patterns", *Proc. of I.E.E.*, vol. 106, Pt. B, No. 26, Mar., 1959, pp. 210–221.

Nolan, "Line/Symbol Separation for Raster Image Processing", *IBM Tech. Disclosure*, vol. 15, No. 12, May, 1973, pp. 3879–3883.

*Primary Examiner*—Leo H. Boudreau
*Attorney, Agent, or Firm*—William Ryan; Robert O. Nimtz

[57] ABSTRACT

A graphic arts image is partitioned into two-dimensional pictorial entities known as "blobs" which are susceptible of identification by a number of parameters. An entire picture is scanned and the relative frequencies of particular blob parameters are used to develop modified variable-length Elias-Huffman codes representative of the parameterized picture information in compacted form. Efficient storage, retrieval and transmission of large sets of high fidelity picture data are thereby facilitated.

13 Claims, 8 Drawing Figures

VARIABLE LENGTH CODES FOR HIGH QUALITY IMAGE ENCODING

BACKGROUND OF THE INVENTION

1. Field of the Invention

The present invention relates to apparatus and methods for the coding and storing of graphical information. More particularly, the present invention relates to apparatus and methods for generating and storing coded representations of high fidelity graphic art images suitable for the photocomposition of printed materials.

2. Description of the Prior Art

Recent years have witnessed greatly increased usage of automatic means for composing and printing page copy for use in directories, catalogs, magazines and other printed works. An important aspect of such photocomposition schemes is the coding and storage of machine-compatible signals representative of graphical source information. In particular, when pictorial information and/or high-resolution type fonts are to be used, it has been found necessary to identify by scanning with great particularity the individual graphical entities associated with the source material. To permit the further processing of these data it has usually been necessary to store them in memories having substantial capacity. Often these data are stored for long times, as when they are to be used in successive issues of a book, magazine or the like. Because typical published materials, especially photographic or other picture materials are so diverse, and because the information content of such materials is so great, the volume of data required to be stored is potentially very large. It is especially important therefore that these data be stored in as efficient a manner as possible.

A number of particular coding and storage schemes have been developed for efficiently storing and transmitting information. For example, the variable length codes described in Elias, "Predictive Coding", *IRE Transactions Information Theory*, March 1955, have proved to be useful in many variations. The well-known Huffman codes described, for example, in Huffman, "A Method for the Construction of Minimum Redundancy Codes," *Proceedings* I.R.E., September 1952, pp. 1098-1101, and Fano, *Transmission of Information*, The MIT Press, 1961, pp. 75-81, offer optimum efficiency under particular circumstances. The application of these techniques to graphical information has generally been limited to one-dimensional coding, i.e., coding of signals associated with a single scan line in the source copy.

U.S. Pat. No. 3,461,231 issued Aug. 12, 1969 to R. V. Quinlan describes a system for performing limited two-dimensional encoding. However, his techniques are limited to transmitting only an indication of the differences between data corresponding to two successive scan lines. A related technique is presented in Tyler, "Two Hardcopy Terminals for PCM Communications of Meteorological Products," *Conference Record*, 1969 *International Conference on Communications*, June 9-11, 1969, pp. 11-21 through 11-28. Tyler encodes his data (meteorological information) in terms of differential lengths for run lengths on two successive scan lines. Huang, "Run-Length Coding and its Extensions", in Huang and Tretiak (Eds.), *Picture Bandwidth Compression*, Gordan and Breach, New York 1972, pp. 231-264, discusses some extensions to the work of Tyler. Other two-dimentional coding of picture information is described in D. N. Graham, "Image Transmission by Two-Dimensional Contour Coding," *Proceedings of the IEEE*, Vol. 55, No. 3, March 1967, pp. 336-345.

The above-cited Quinlan and Tyler references indicate a need to determine not only what is encoded, i.e., which parameters are encoded, but also how, exactly, these parameters are to be encoded. The latter aspect of the problem is also treated in U.S. Pat. No. 3,643,019, issued Feb. 15, 1972 to J. P. Beltz. Particular reference is made by Beltz of the applicability of his techniques in commercial photocomposition systems such as the RCA VIDEOCOMP Series 70/800. Although Beltz applies a variable-length coding to segments defining a "zone", each such zone is the area defined by a single scan line, i.e., he does not attempt to extend his results to two-dimensional coding. Likewise, though Graham and Huang speak of Huffman codes, their application is to very specific geometric entities.

SUMMARY OF THE INVENTION

In accordance with one embodiment of the present invention, a visible image, e.g., a photograph, typed copy, line drawing or any combination of these or like images, is scanned, sampled and converted into two-level quantized signals. Quantized signals representing like-valued geometrically related image areas known as "blobs" are identified and designated to be processed together. Thus signals representing each of the blobs in the image are analyzed and a number of important blob parameters are extracted in each case. A frequency analysis of values for the blob parameters is then performed. Based on the results of these analyses a code assignment is made to each of the blob parameter values based on its relative frequency of occurrence. Thus, for example, frequently occurring blob parameter values are assigned short code words while infrequently occurring blob parameter values are assigned long code words. A particular code used in one embodiment is a variation of the above-cited Huffman code.

A number of alternative blob characterizations and codes are presented in which certain approximations yield significant efficiencies with scant sacrifice of fidelity.

A preferred embodiment of the present invention utilizes a programmed general purpose digital computer.

DETAILED DESCRIPTION

1. Background and Definitions

Before proceeding with the detailed description, it proves convenient to define certain terms and describe some conventions used with some regularity in the sequal.

Figure 1:
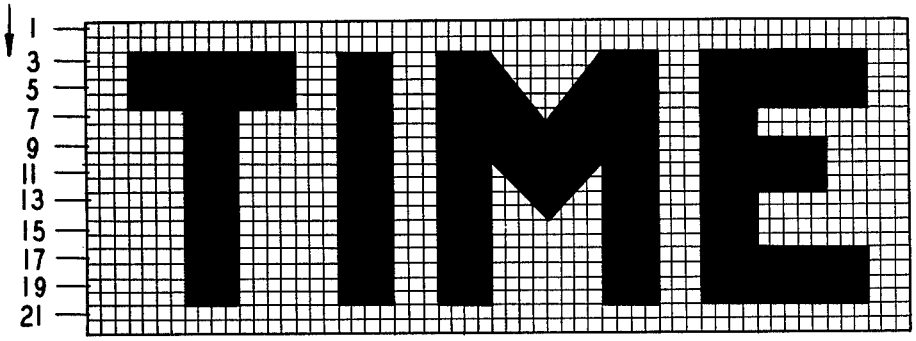
FIG. 1 shows a simple black-on-white image which serves as a vehicle for illustrating certain fundamental image processing functions.

It is well known that much information-bearing copy has only two levels of image intensity, e.g., black and white. In other cases one or more intermediate brightness levels, i.e., gray levels, are used. In still other cases, multiple colors and brightness levels are used. For present purposes, image copy will be assumed to possess only two brightness levels (conveniently black and white), although generalization to multiple intensities and different colors will be apparent to those skilled in the art. For example, FIG. 1 shows an image comprising the word TIME in black on a white background. When actual image intensity is not two-valued, a standard quantizing operation will be used to "round-off" signals representing such images.

Although high quality reproduction of images often requires substantial continuity of all connected parts of an image, i.e., no gaps in the reproduced image, it proves convenient in intermediate processing to use digital techniques, i.e., to treat such images as collections of discrete elements. Thus in the range of FIG. 1 there is superimposed on the image a grid of horizontal and vertical lines defining individual picture elements (pels). For ease of explanation the grid shown in FIG. 1 is considerably coarser than that required for high fidelity reproduction. In practice these pels are arbitrarily, but sequentially, assigned to particular image subject matter by causing the image to be scanned by an optical or other scanning means, thereby to generate a signal indicative of the brightness level occurring along a narrow scan line. A typical optical image scanning system is disclosed in U.S. Pat. No. 3,445,588 issued to J. F. Nicholson on May 20, 1969. Functionally equivalent scanning apparatus is disclosed in the abovecited Beltz patent in connection with the RCA VIDEOCOMP Series 70/800 photocomposition system. Many particular scanning devices may be used to generate signals representative of the image intensity along a scan line.

Figure 2:
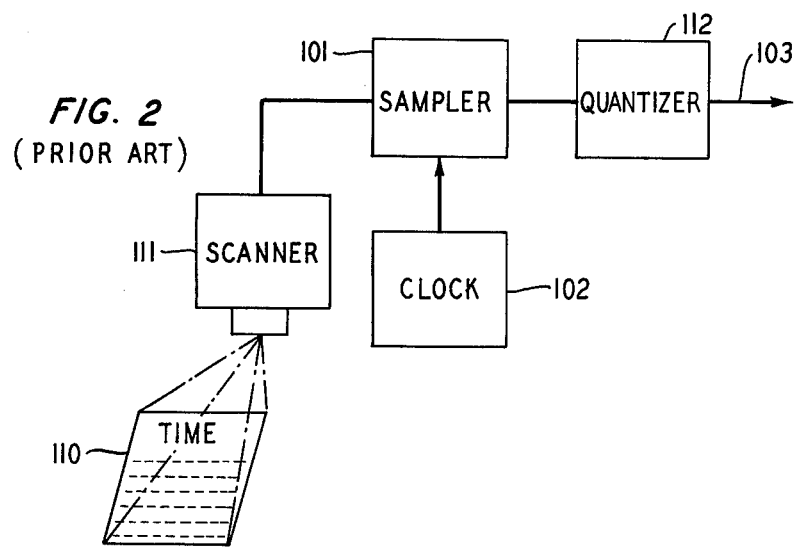
FIG. 2 shows prior art image scanning, sampling and quantizing circuitry.

The actual definition of individual pels is accomplished in standard practice by sampling the output of the scanner. Thus, in general, the output of a scanner is a continuous signal not unlike that associated with standard television broadcast signals. These signals are then sampled in response to periodic clock signals generated by a source of standard design. FIG. 2 shows in block diagram form typical prior art circuitry for performing the scanning and sampling operation. An image 110 is scanned repetitively along horizontal lines by scanner 111. Sampling (sample and hold) circuit 101 then samples the continuous output from scanner 111 in response to timing signals from clock circuit 102. As noted above, in some cases the image will correspond to other than simple black-and-white intensities. In this case quantizer 112 is used to generate a quantized version of the signals generated by scanner 111 as sampled by sampling circuit 101. Because these operations are commonplace in the image processing and other arts, further details of the circuitry in FIG. 2 will not be disclosed explicity.

Returning again to the image of FIG. 1 as superimposed on the background grid horizontal and vertical lines, it is noted that a pattern of 22 horizontal strips or scan lines is used to define pels associated with the entire image (TIME) and a representative portion of the background. Each scan line in turn is conveniently divided into 59 picture elements as in the Quinlan U.S. Pat. No. 3,461,231 cited above. The simple case illustrated in FIG. 1 corresponds to the case where each image entity (letters in this case) exactly fills the area defined by an integral number of pels. No such limitation is fundamental to the present invention, however, as will be seen below.

Figure 3:
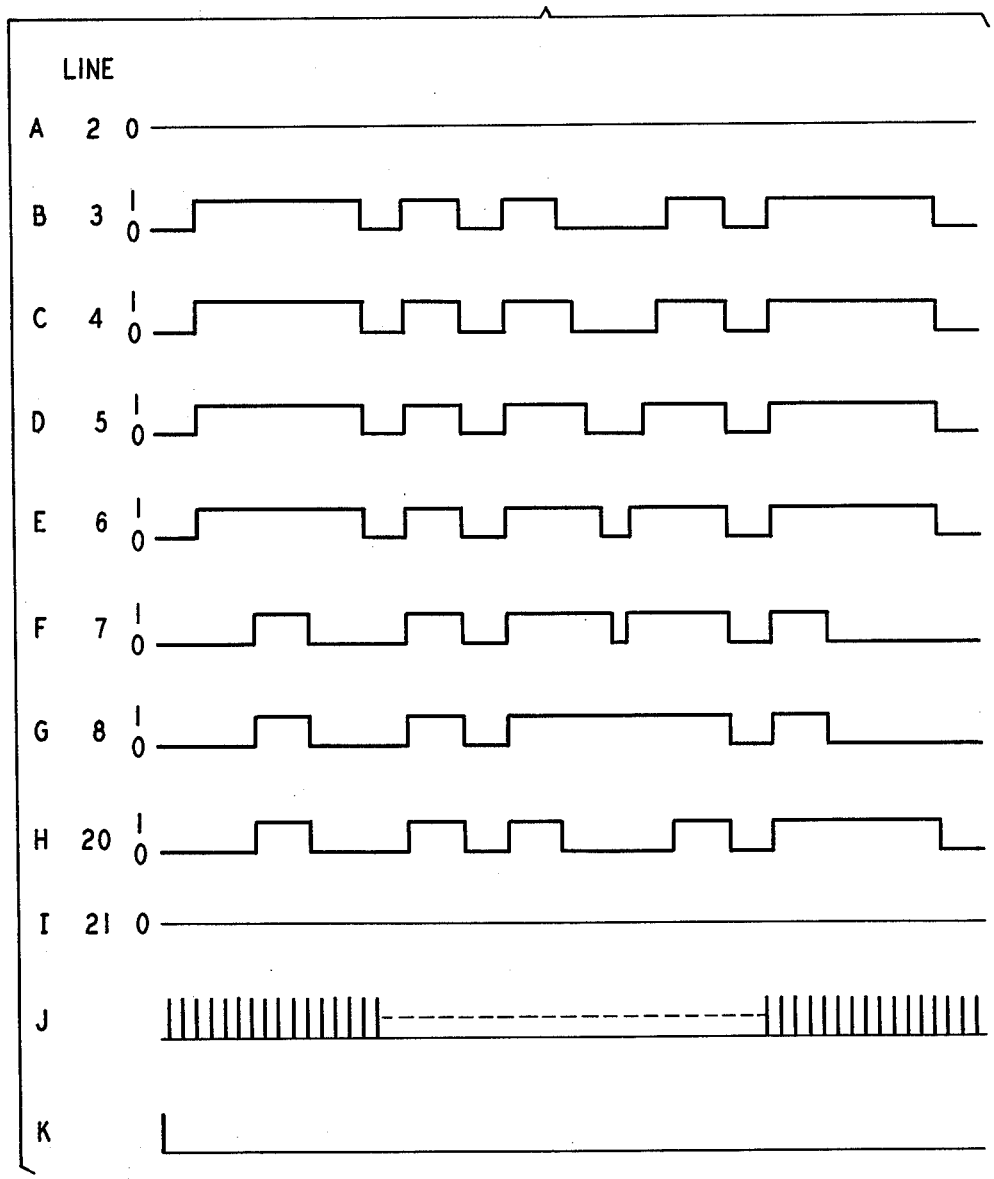
FIGS. 3A-3K show typical signals representative of the image of FIG. 1 and useful clock signals in timed relation with said typical signals.

FIGS. 3A–K show typical signals generated by the circuitry of FIG. 2 when used to operate on an image of the type shown in FIG. 1. FIG. 3J shows clock signals generated by clock circuit 102 in FIG. 2. These clock signals occur at the rate of one for each time interval equal to the time required for scanner 111 to scan along a given scan line for a distance equal to the length of one pel. When applied to sampler circuit 101 the signal shown in FIG. 3J causes a value equal to that appearing on the output of scanner 111 to be sampled and held for a duration equal to one clock interval. This value appears at the output of sampler circuit 101. Since the image shown in FIG. 1 is a simple black and white image, quantizer 12 shown in FIG. 2 does not alter (except, perhaps in absolute magnitude where appropriate) the signals generated by sample-and-hold circuit 101. Thus the output appearing on lead 103 in FIG. 2 for typical identified scan lines of the image shown in FIG. 1 appears in FIGS. 3A–I. FIG. 3K illustrates a scan-line clock signal conveniently provided by clock circuit 102; the repetition rate is equal to one pulse every 59 pel invervals.

As commonly used in television and other picture processing arts, a "run" is an occurrence of like-brightness level pels in consecutive pel positions along a scan line. Thus in FIG. 1, on scan line 3, a black run begins at the fourth pel and continues through the fifteenth pel, a run of 12 black pels. While horizontal scanning is assumed in the present disclosure, it is clear that similar runs can be defined for vertical scan lines. In further connection with the actual scanning, it will be assumed that each scan line proceeds from a left end to a right end. Particular pels along each scan line are identified by an abscissa coordinate integer beginning at the left with 1 and ending with N for an N-pel scan line.

A collection of geometrically related pels of like brightness level which satisfy certain connectivity constraints shall be designated a "blob." Much of the following detailed description will proceed in terms of such blobs. In particular, a blob comprises one or more runs of pels of the same brightness level on successive lines satisfying the condition that Run beginnings and endings, respectively, of two successive runs on successive scan lines are no more than J pels apart in the direction along the scan lines.

Figure 4:
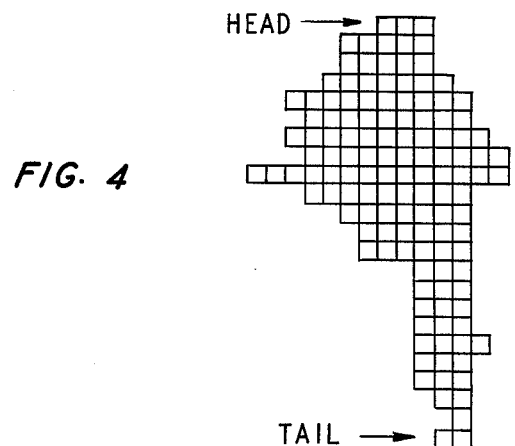
FIG. 4 shows a typical blob.

In typical operation a value of $J=3$ yields good results. The first (highest or leftmost for horizontal and vertical scan lines, respectively run in a blob is called a "head;" the last (lowest or rightmost for horizontal and vertical scan lines, respectively) run is analogously referred to as a "tail." Runs on scan lines between head and tail scan lines are referred to as "intermediate" or "spine" runs. FIG. 4 shows a typical non-rectangular blob with the head and tail identified explicitly. Note that the left end of the top (head) run is positioned only two pels from the left end of the second run and that the respective right ends are not relatively displaced at all horizontally. Thus the J = 3 constraint has been observed for the first two (and by inspections all remaining) runs.

It should also be noted that a blob may consist of only a single run (a head) or of two runs (a head and a tail).

2. Overview of a Typical Embodiment

Figure 5:
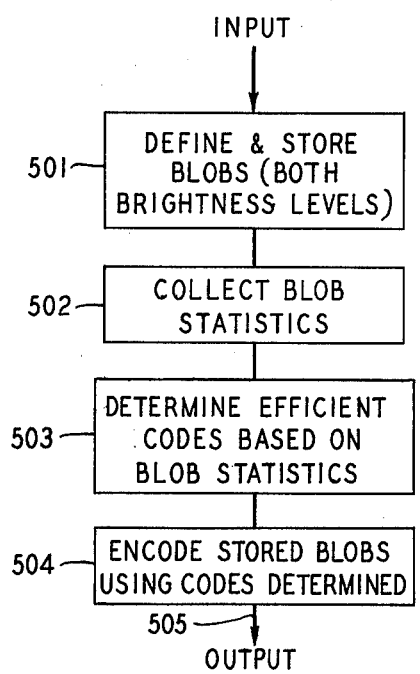
FIG. 5 shows an overall block diagram, in accordance with one embodiment of the present invention, of a system for encoding and storing signals supplied by a circuit such as that shown in FIG. 2 which are representative of graphic art images including those shown in FIGS. 1 and 4.

FIG. 5 shows a broad flow diagram of processing by a preferred encoding and storage system for graphic art images in accordance with the present invention. It should be noted as a preliminary matter however, that in typical operation, scanner 111 in FIG. 2 may scan over image 110 at a density of 200–2,000 scan lines per inch. This should be contrasted with the relatively sparse occurrence of scan lines illustratively shown in FIG. 1. The amount of information presented on the lead 103 (the output lead from quantizer 112 in FIG. 2) to be processed in accordance with FIG. 5 may therefore be considerable. The present invention is directed to improved means and methods for coding and storing this information.

FIG. 5 defines the processing of the input stream of data from the quantizer 112 in FIG. 2. It proves convenient to divide the overall processing of input information into four principal processing functions, as shown in FIG. 5. Each of these will now be described separately.

Block 501 in FIG. 5 indicates that the input stream from quantizer 112 (or sampler 101 if quantization proves unnecessary) is initially operated on to define the individual blobs in the input data. For reasons to become apparent shortly, blobs of both brightness levels are extracted. In the process of defining blobs, it is typical to scan a current and an immediately preceding scan line to determine connectivity. The definition processing involves the extraction of a relevant number of parameters to describe the individual blobs. After the parameters have been derived, the raw data need no longer be stored. Instead, only the parameters need be stored for subsequent processing. Thus, the "current line" data replaces the "preceding line" data, and a new "current line" is read. The blob definition and storage processing results in the storing of a list or stack of data entries for each run. In particular, there is stored for each run an indication of the abscissae of the left and right ends of the run, and pointers to other stack entries for connecting runs in a blob.

Block 502 in FIG. 5 corresponds to the function of collecting blob statistics, i.e., the number of occurrences of particular values for the blob parameters. It proves convenient, for example, to determine the frequency of occurrences of particular values for 1. the length of the heads;
2. the "connection pattern" of the left and right ends of a run to the left and right ends of the preceding run in a given blob, if any; and
3. the blob position.

The "connection pattern" for a particular run comprises either two separate codes, one each for the left and right ends of the run, or one code representative of the manner in which the run connects at both ends. The blob position is encoded as the distance from the blob to the previously encoded blob of the same brightness level. Specifically, it is the number of pels scanned in the line-by-line scan starting to the right of the right end of the head of the previous blob of the same brightness level and ending at the left end of the head of the current blob. The first blob of each brightness level is positioned relative to the beginning of the first scan line.

Based on the statistics derived in processing represented by the block 502 in FIG. 5, a determination (block 503) is made of which codes may be most efficiently used to encode the blob parameters. The derivation of the "best" codes is determined by identifying those codes requiring the minimum total number of bits upon final encoding of the blob parameters. As was noted above, blob parameters (and related statistics) are derived for blobs of each brightness level. Upon final encoding, of course, only blobs of one brightness level need be encoded and stored. However, having available statistics for blobs of both brightness levels permits the selection of that set of blobs (all of a single brightness level) requiring the fewest bits.

Figure 6:
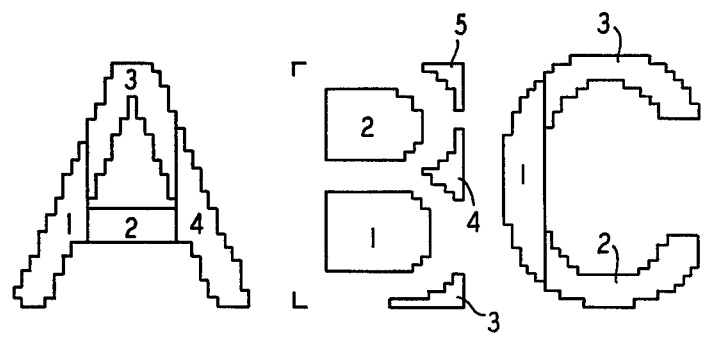
FIG. 6 shows how commonly occurring graphic art images (type fonts) are conveniently segmented into blobs in accordance with one aspect of the present invention.

To illustrate the manner in which a selection between blobs of one brightness level or the other may be made, reference is made to FIG. 6. FIG. 6 illustrates the blob configuration for the letters A, B and C in a particular type font. Vertical scanning at the rate of 480 lines per inch has been used. The individual blobs are separately identified in FIG. 6. Note that the letter B achieves minimum coding when the negative image (the background in the sense of FIG. 1) is encoded rather than the actual image itself.

The final block in FIG. 5, 504, corresponds to the actual encoding of the parameters for each of the stored runs using the codes derived by the processing indicated by 503 in FIG. 5. A more efficient coding is achieved by encoding the parameters of all successive runs in a given blob before proceeding to those runs for the next succeeding blob. The blobs are encoded in the sequence in which their heads were encountered in the scanning process. The encoding of each blob consists of 1. a position code;
2. a code for the length of the head;
3. one or two connection codes for each body and tail run, if any; and
4. a blob end code.

It is noted that the end code must be distinct from any of the connection codes to properly demark successive blobs.

PREFERRED CODES

Although many advantages of the present invention accrue merely by reason of the identification and parameterization of graphic features, i.e., blobs, it proves convenient to consider further advantages flowing from the selection of particular codes for the various blob parameters. This section will discuss particular codes which may be utilized to yield high efficiency coding as compared with other well-known coding techniques. These codes are optimum or near optimum for important classes of graphic information.

It is useful to consider as an illustration some of the factors involved in choosing a code for the blob position parameter. It should be recalled that position is specified in accordance with the number of pels scanned along from a reference point to the start of the associated blob. The (relative) position parameter for indicating the location of a given blob relative to a previous blob of the same brightness level may be made by recording a 1 for each pel at the start of a blob and a 0 for each pel scanned starting at the right of the head run of a blob and continuing to the next blob head of the same brightness level. For example, if the character T in FIG. 1 is deemed to be divided into two blobs (one for the vertical member and one for the horizontal member) and the character I consists of a single blob, then the position parameter indications (beginning with the horizontal blob of the T) would be 10001 . . . .

The frequency count of particular values for the position parameter for various blobs then resolves to making a frequency count of the lengths of runs of Os intermediate each 1. For an image with N blobs there will, of course, be N runs of Os. It proves convenient to treat the frequency count, converted to percentages, as a probability distribution P attributed to some source S. Thus, the assignment of codes to parameter values is equivalent to the assignment of code words for an ordinary communication source whose messages occur in accordance with the probability distribution P. Assuming S to be memoryless, it is clear that the smallest attainable number of bits per message is the first order entropy H1 of P. See, for example, Fano, *Transmission of Information,* MIT Press 1961, Chapter 2.

A particularly efficient code to be used for encoding information from such a source S is the run length coding described in Elias, "Predictive Coding," *IRE Trans. on Information Theory,* March 1955, pp. 16–33. In Elias method the run length (where the run is the run length of Os) is encoded using a variable length code word of symbols of base M + 1 in positional form. One of the M + 1 values separates code words. For many typical graphical images, a value of M = 3 proves particularly convenient. No codebooks are required for this code because it is constricted algebraically.

In other cases it proves convenient to use the well-known Huffman coding techniques in deriving code books for run lengths of the type described above in this section. Huffman codes are also described at some length in the above-cited Fano book.

While it has been assumed that a separate code book is to be generated for each image it should be clear that this need not be the case. Thus, for images of some complexity (involving relatively large code books), which images have a general similarity to each other, it is possible to utilize a single code book for an entire ensemble of images. The degree of similarity of successive images and the relative availability of facilities for calculating and storing code books will, of course, dictate the relative merits of using specially tailored code books or ensemble code books for successive images.

Where it is necessary to use codebooks specially tailored for each image, the amount of storage required for the codebooks often becomes critical, particularly for high resolution processing. In some cases we can use a well-known procedure to decrease the required storage by modifying the code structure so that the number of variable-length codes, and hence the number of codebook items, is less than the total number of parameter values. This is done by first sectioning a particular subset of the parameter values into a number of distinct ranges or groups, and assigning one variable-length codeword to each group, rather than to each member in the group. For a particular parameter value within such a group, the code consists of the variable-length codeword assigned to the group, followed by a fixed-length codeword, which distinguishes among the members of the group.

However, this latter procedure is economical only where the original distribution is sparse toward one end, which end accommodates the grouped parameter values. For, use of both a variable-length code and a fixed-length code for any given parameter value increases the storage required for the parameter value codewords. Only where such dual variable and fixed-length encodings occur rarely, does the saving in codebook storage offset the increase in the storage for the parameter value codewords. This approach is economical, for example, in the encoding of the head length parameter. It is not useful wherever the original distribution is relatively flat, as it often is for the position parameter.

It is possible, however to derive in accordance with another aspect of the present invention a new code hereinafter referred to as "Huffman Modulo Coding."

Starting with an original frequency count, two other frequency counts are derived. Each item contributing to the original frequency count is divided by a base, B, obtaining a multiple of the base and a non-negative remainder less than the base. Frequency counts of the multiples, and of the remainders are then formed separately. The codebook size, K, of the original frequency count is equal to the largest contributing item. In effect, the multiple frequency count is the original frequency count partitioned into (K/B)+1 consecutive groups. The remainder frequency count is the original frequency count partitioned into B residue classes.

Next, the Huffman codes for the multiple and remainder distributions are derived separately. Each original source symbol is now encoded with two codes, one for the multiple, and one for the remainder. The total number of bits required by the original encoding, T1, and the total required by the derived encoding, T2 are then compared. Note that:

$$T1 = S1 + C1$$

$$T2 = S2 + S3 + C2 + C3$$

where,

S1 = bits to encode original source data
C1 = bits for codebook for original codes
S2 = bits to encode multiples
C2 = bits for codebook for multiple codes
S3 = bits to encode remainders
C3 = bits for codebook for remainder codes.

A judicious choice of B results in T2 less than T1. T2 consists of the two parts (S2+S3) and (C2+C3). These items vary with B, which ranges from 1 to K. First, inspecting (S2+S3), we note that when B is one, the multiple and original distributions are identical, resulting in S2=S1, and S3=0. The remainder distribution is treated as null, since it contains only one entry. When B equals K, the multiple distribution is treated as null, and the remainder and original distributions are identical, resulting in S2=0, and S3=S1. As B ranges from 1 to K, the multiple bits, S2, start at S1 and tend toward zero, whereas the remainder bits, S3, start at zero and tend toward S1. For simplified cases with very regular original distribution, it can be shown that the sum (S2+S3) is constant for all B. In actual examples this sum tends very slowly upwards as B increases.

Considering the multiple and remainder codebook bits, C2 and C3, it is noted first that to minimize the storage of any Huffman codebook where the code words are in monotonic order, the codes themselves do not have to be stored. Instead the number of significant bits of the codes are considered in the order they appear in the associated frequency count. The set of such lengths in frequency count order is then run-length encoded. These encoded run lengths comprise the codebook bits. Assume for the moment that the number of bits required to store a codebook is roughly proportional to the number of items in the codebook. The sum of the number of items in the multiple and remainder codebooks is $f(B) = (K/B)+1+B$. This function is minimum at $B = \sqrt{K}$. At this base the number of codebook items is $f(\sqrt{K}) = 2\sqrt{K} + 1$. Under the assumption that the number of bits required to store the codebooks is directly proportional to the size of the codebooks, the theoretical reduction in codebook bits of the Huffman Modulo code over the simple Huffman code is $(2\sqrt{K} + 1) K$, or, $2\sqrt{K}$ for large K.

In actuality, the number of codebook bits depends on the codebook size (but not linearly), the properties of the original distribution and the procedure to encode the codebook. In practice, an approximation to the base giving the minimum number of codebook bits is chosen using the formula $$B = (-1 + \sqrt{1 + 0.8(C1)})/2.$$

Codebook reductions experienced are in the neighborhood of .08. In many cases, compression of the codebooks in this manner yields a smaller number of total bits for Huffman coding than for the Elias coding. The Huffman Modulo coding method can, of course, be iterated on the derived multiple and remainder distributions to higher levels.

APPROXIMATION

Useful approximations to the above-described coding techniques may range from near exact reproduction to greatly simplified representations. For the latter, encoding the blobs with various derived parameters such as centroid and mass, or with a code indicating one of a set of patterns, along with size and orientation may be used.

One more accurate approximation (hereinafter referred to as the first approximate coding) involves the identification of all heads and tails which do not exceed N pels. Such runs are not encoded exactly. Rather, they are grouped together and the total number of pels in the group is encoded. Upon decoding, these pels are regenerated with near exact replacement.

Figure 8:
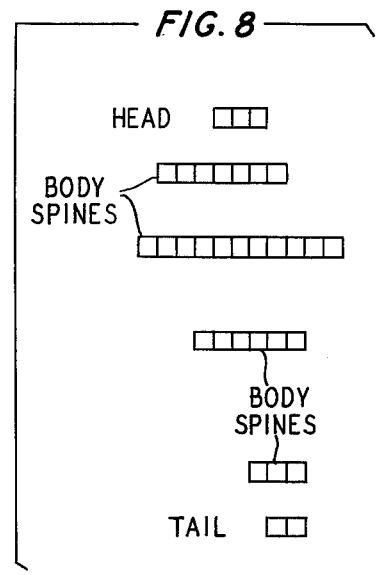
FIG. 8 shows a useful approximate blob in accordance with another aspect of the present invention.

Another good approximate process (hereinafter referred to as the second approximate coding) codes explicitly only a subset of the blob runs, called spines. Heads and tails are always spines. A spine other than these has the property that runs between it and the preceding spine (called fillers), as well as the spine itself (but not the run succeeding the spine), have left ends which are no more than J away from the left end of the preceding spine. The right ends of intermediate spines are characterized in an equivalent manner. In FIG. 8 an approximate blob with a head, tail and 4 intermediate spines is shown. Between two spines, only the total number of filler runs is encoded. As with the other blob parameters, a frequency count of the size of the fills between spines is made. Upon decoding, the filler runs are regenerated using a linear or special nonlinear interpolation process.

For line drawings and art illustrations, the use of both the first and second approximate processes together has been found to be very satisfactory. For fonts, the second approximate procedure alone is acceptable, though exact encoding is suggested for highest quality results.

DETAILED IMPLEMENTATION

Figure 7:
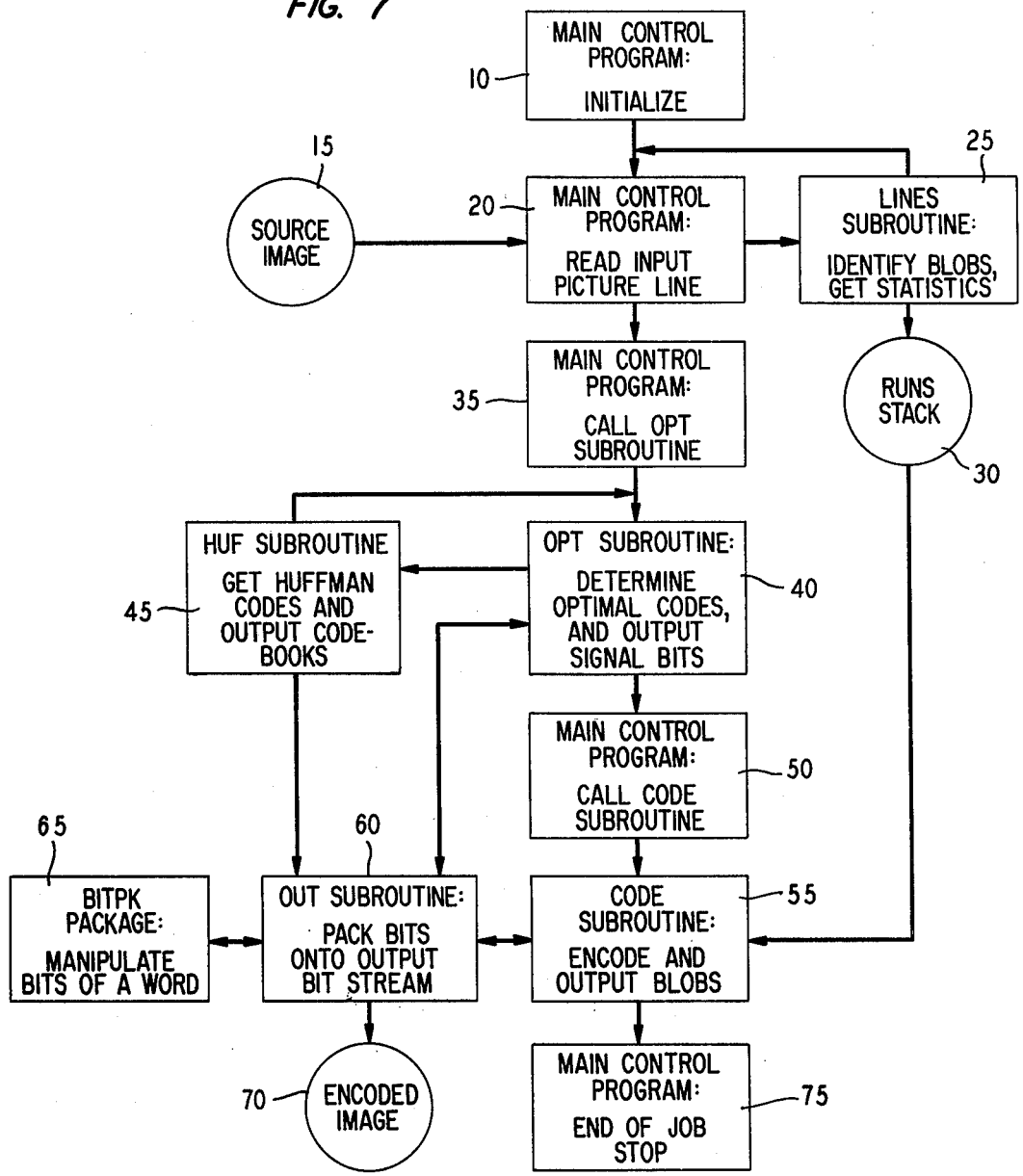
FIG. 7 is a flowchart identifying the sequence of operations performed in a preferred embodiment of the present invention.

As will be appreciated by those skilled in the art, the image coding, storage and regeneration processing and apparatus in accordance with the present invention are preferably realized using a programmed general purpose computer. Thus, FIG. 7, is a flowchart of an encoding process suitable for practice on a general purpose computer typified by the Honeywell 6000 Series general purpose computer. Similarly, apparatus for realizing a preferred embodiment of the present invention comprises a Honeywell 6000 Series general purpose computer as conditioned by programs to be described in the sequel, and their equivalents.

The general structure of the blob encoding program is diagrammed in FIG. 7. It comprises a main control program and six subprograms, called LINES, OPT, HUF, CODE, OUT, and BITPK. All programs except BITPK are conveniently implemented in FORTRAN. BITPK is a bit manipulating package written in the Honeywell 6000 (formerly General Electric 600) computer assembly language. See GE-600 Line *FORTRAN IV Reference Manual*, GE, 1970, for a description of an appropriate dialect of FORTRAN and *GE-625/635 Programming Reference Manual*, GE, 1969, for a description of an appropriate dialect of the assembler and the general programming environment of the cited machined. The functions of each program block will be described below.

The image is digitized, sampled form is assumed to be accessible on a peripheral device such as magnetic tape or disk, as indicated in block 15 in FIG. 7. It consists of successive black or white (1 or 0) brightness level samples, one per pel, obtained by a left to right, line by line scan. The following program descriptions proceed, in part, in terms of rectangular image windows, recognizing that an image may be placed on a constant background. Coding efficiencies result from stripping off and excluding from the encoding process any peripheral rectangular borders on one or more sides of the image, where all such borders consist of pels of like brightness level.

Decoding of the encoded data and regeneration of the brightness level samples corresponding to a digitized form of the image proceeds as a reverse process to the encoding process described above. Procedures to parse a bit stream encoded in Huffman or Elias codes and assign output code values are well known to those skilled in the art. However, the present invention includes new procedures to generate the approximate images described previously. Accordingly, included below is a description and a detailed FORTRAN program implementing this portion of the regeneration process.

MAIN CONTROL PROGRAM

At block 10, the main control program first reads in a number of numeric run-time parameters as indicated below.

| Parameter | Description |
|---|---|
| NLIN | This is the number of lines in the image in the input file, assumed to be numbered 1 through NLIN from top to bottom. |
| NSAM | This is the number of samples or picture elements |

-continued

| Para-meter | Description |
|---|---|
| | (pels) per line in the image in the input file, assumed to be numbered 1 through NSAM from left to right. |
| IWT | This is the line number of the top of a window of the image in the input file. Only the specified window is actually encoded. If the value read for IWT is equal to 0, the program changes it to 1. |
| IWB | This is the line number of the bottom of the window to be encoded. If the value read for IWB is equal to 0, the program changes it to the value of NLIN. |
| IWL | This is the number of the left most sample in the window. If the value read for IWL is equal to 0, the program changes it to 1. |
| IPOX | This indicates the type of encoding that is to be done, as follows:<br>  0  Encode image exactly.<br>  1  Encode image using "first" type of approximation only, i.e., remove all blob head and tail runs that are less than or equal to the amount ISNOW in length.<br>  2  Encode image using "second" type of approximation where only a subset of the blob runs are encoded exactly. In addition, if ISNOW, is not 0, then use the "first" type of approximation process as well. |
| ISNOW | This is the maximum number of pels in a blob head or tail run to be encoded in grouped form if the first approximation process is operative. |
| IBACK | This indicates how the background gray level is to be determined. If IBACK < 0, the program is to determine the background level to be that level requiring the most number of bits to encode. If IBACK ≧ 0, then IBACK indicates the level to be used as the background level. |
| INC | This is the absolute value of the number of pels difference between the left end of two successive runs in a blob, and between the right ends of two successive runs in a blob. |
| ISTKSZ | This is the number of computer words alotted to the ISTK stack. |

After reading in the foregoing parameters, the main control program then initializes a number of program variables. It then reads in at block 20 the samples of an image indicated at block 15, a line at a time. For each line of samples, it calls the LINES subroutine at block 25 for detailed processing. After all the lines in the specified window have been read by the main program and processed by the LINES subroutine, the main program then calls in succession the OPT subroutine at block 35 and the CODE subroutine at block 50, and finally terminates the job at block 75.

LINES SUBROUTINE (BLOCK 25)

This subroutine identifies the blobs. A blob is a set of runs of like gray level on successive lines such that for any two successive runs, the left ends of the runs are no more than INC pels apart, and similarly the right ends are no more than INC pels apart. If an approximation type of encoding is specified, the subroutine operates upon the blobs to effect the approximation. In addition, this subroutine collects statistics on the various blob parameters, as indicated below:

| Para-meter | Description |
|---|---|
| NPOS | This is the number of blob "position" values by magnitude by gray level. For this embodiment the maximum position value may be 20,000. If this value is exceeded for a particular image, the program is aborted. |
| NHEAD | This is the number of blob head run lengths by magnitude by gray level. This embodiment uses 43 magnitude categories for each gray level. The categories 1-40 respectively correspond to the head run lengths of 1-40 pels respectively. The 41$^{st}$ category includes head run lengths of 41-72. The 42$^{nd}$ category includes head run lengths of 73-200. The 43$^{rd}$ category includes head run lengths of 201-1024. |
| NINC | This is the number of explicitly encoded runs other than the head runs in the blobs, by connection pattern by gray level. The connection pattern is a code indicating the way in which a run connects to the last previous explicitly encoded run in a blob. These codes are discussed further below. For both exact and approximate type of encodings, any two successive runs in a blob are such that their left ends are no more than INC pels apart, and similarly for their right ends as indicated above. However, for the second type of approximation encoding, only a subset of the runs following the head run are explicitly encoded. These runs are called spines, and have the following property. All runs in a blob following a given spine up to and including the next spine, but not including the run following the next spine, connect to the first given spine by one of the standard connection patterns. The set of blob runs between two successive spines is called a filler. The runs comprising a filler are not encoded explicitly. For each filler, only the number of runs in the filler is encoded. |
| NFILL | This is the number of fillers by number of runs by gray level if the second approximation type of encoding is operative. This embodiment uses 18 magnitude categories for each gray level. The categories 1-16 respectively correspond to the filler lengths of 0-15 runs respectively. The 17$^{th}$ category includes filler lengths of 16-31 runs, and the 18$^{th}$ category includes filler lengths of 32-255 runs. |
| NSNOW | This is the total number of head and tail pels removed if the first approximation type of encoding is operative. |

The LINES subroutine maintains fifteen arrays, five each for the current line, called the C line, the first line prior to the current line, called the B line, and the second line prior to the current line, called the A line. For each current line, the LINES subroutine identifies runs of like gray level. For each run, the program determines if the run connects to a run of the same gray level in the first previous or B line. If the first approximation type encoding is operative, the subroutine determines for each head or tail run in the B line, whether or not it is to be removed. If a head is removed, the next run in the blob, if any, is called a subhead. Similarly, if a tail is removed, the previous run in the blob is called a subtail. In addition, if the second type approximation encoding is operative, the subroutine determines for each run in the A line if it is a spine or a filler run. It is a spine if it is the last run in a blob, or, if the run it connects to in the B line does not connect to the last previously identified spine or head run in the blob. The data concerning the prior spine is contained in the A line arrays. The five arrays for each of the A, B, C lines contain the information indicated below. The elements of these arrays are cross-related, i.e. the $k^{th}$ elements of the five arrays all refer to the $k^{th}$ run in the indicated line.

| Array Number | Description |
|---|---|
| 1 | This contains a pointer, relative to the start of the next line, of the next run in the blob, if any. |
| 2 | Gray level |
| 3 | This contains a code indicating the type of run, and, if it is a spine, the connection pattern between the spine and the previous spine. It assumes the following values:<br>  Value    Meaning<br>    0    Run is an empty item, i.e., it is a head or tail that has been removed.<br>  1-49  Run is a spine or filler; value of code gives connection pattern to previous run in blob.<br>    50    Run is a subhead. |

-continued

| Array Number | Description |
|---|---|
| | 51  Run is a head. |
| 4 | This contains the number of pels from the left end of the line up to and including the left end of the run. If the second approximation type of encoding is operative, and this is the A line, it also contains (a) the number of filler runs between this run and the last previous spine, and (b) the number of pels from the left end of the line up to and including the left end of the last previous spine. |
| 5 | This contains the number of pels from the left end of the line up to and including the right end of the run. If the second approximation type of encoding is operative, and this is the A line, it also contains the number of pels from the left end of the line up to and including the right end of the previous spine. |

After the LINES subroutine enters the pertinent items for a line in the five arrays for the C line, it compresses and transfers the information for the A line to the ISTK stack (Block 30). For each picture line, this stack contains one word giving the number of runs in the line, and one word for each of the runs in the line. If the ISTK stack fills up, the LINES subroutine writes it out onto a peripheral device and resets the stack pointer to the top of the stack.

After entering the information from the A line onto the ISTK stack, the B line becomes the A line, and the C line becomes the B line, leaving the C line arrays open for the next line to be processed. This switching of arrays is done by using three separate CALL statements in the main control program, rather than by actually moving data within main memory or by switching indices. We note also that this embodiment uses working arrays for three picture lines for all types of encoding. The full three are required only where the second approximation type of encoding is operative. For the other types of encoding, arrays for two picture lines would suffice.

OPT SUBROUTINE (BLOCK 40)

In general, for each of the gray levels, and for each of the blob parameters, this subroutine determines which of the two codes, namely, the Elias run-length code, or a Huffman code requires the smaller number of bits. This determination is based on the statistics compiled by the LINES subroutine. For Huffman codes, this embodiment uses individual codebooks for each picture, rather than codebooks for an ensemble of pictures. Additional specifications are indicated below:

(1) As described previously, the frequency counts for head lengths assume 43 categories. The last three of these include a range of head lengths. Accordingly, the Huffman codes derived for each of these three categories respectively is actually a prefix code, which is followed by a fixed length code of 5, 7 and 10 bits respectively. The fixed length code gives the position of the given head length within the range of head lengths covered by the indicated category. A similar operation is made for the last two categories of filler lengths, where the fixed length codes are 4 and 8 bits respectively.

(2) The codes for the connection patterns must be distinct from the blob end code. Accordingly, these are considered in conjunction with each other in both the Elias and Huffman coding methods. In addition, for the Elias encoding, the end code is assigned a smaller value than the connection pattern codes if the number of end codes is less than the frequency counts of each of the connection patterns. Otherwise it is assigned a larger value than any of the connection pattern codes.

(3) For the connection pattern code, the OPT subroutine actually inspects four possibilities resulting from using the first or second extension for the connection pattern, in combination with the Elias and Huffman codes. In the first extension, the connection pattern between two successive spines in a blob is encoded with two codewords, one each for the left ends and the right ends. Each of these codewords assumes one of seven values. In the second extension, the connection patterns between two successive spines is encoded with one codeword, which assumes one of forty-nine values, representing the combination of seven possibilities for the left end connection with seven possibilities for the right end connection. The second extension capitalizes on correlation between the joint movement of left and right ends of successive runs in a blob.

(4) For the blob positions, the OPT subroutine inspects the Elias coding and the modified form of the Huffman coding, called Huffman Modulo Coding, disclosed herein. In this new form of encoding, the original frequency distribution of the position parameter obtained from the LINES subroutine is operated upon to form two other frequency distributions, which when taken together contain the same information as the original frequency distribution. This is done by dividing each term of the original frequency distribution by a base, B, thus obtaining a positive multiple, and a positive remainder less than B. Separate frequency counts are made of the occurrence of particular multiples and particular remainders. Huffman codes are then obtained for each of these derived distributions separately. Using this method, a source symbol is then encoded with two codewords, one for the multiple and one for the remainder. In general, the sum of the number of terms in the multiple and remainder distributions is less than the number of terms in the original distribution. This results in less bits to encode the codebook, and slightly increased bits for the codewords for the source symbols. Of all the possible bases, B, there exists one which minimizes the sum of the codebook bits and the codeword bits. In this embodiment we form an algorithmic approximation to that base which gives the minimum number of total bits. We do this by first computing the number of bits to store the codebook using a base of 1. We call this number of bits JBITMD. The algorithmic approximation to the base then is:

$$(-1 + \sqrt{1 + 0.8(JBITMD)})/2$$

After determining the optimum codes for each of the blob parameters, the OPT subroutine enters on the encoded output bit stream a number of "signal" bits which indicate the code choices made. For those choices involving Huffman codes, the OPT subroutine calls the HUF subroutine, which in turn enters the associated codebooks on the output bit stream in compressed form. The final function of the OPT subroutine is to generate a table of the Elias codes for the values 1 through 121. This speeds the blob encoding process carried out by the subroutine CODE.

HUF SUBROUTINE (BLOCK 45)

Given a frequency distribution, this subroutine computes:

(a) an array containing the Huffman codes.

(b) an array containing the lengths in bits of each of the Huffman codes.

(c) the number of bits to encode the codebook. This is based on a run-length encoding of the data in (b) above.

The HUF subroutine may also actually encode and output the codebook.

CODE SUBROUTINE

This subroutine encodes and outputs the codes for the various blob parameters. It starts processing the ISTK stack with the first blob head or subhead item. It encodes and outputs the position of the blob and the length of the head. It then determines if another spine follows in the blob. If so, it retrieves the succeeding spine item from the stack, and encodes and outputs the connection pattern. If the second approximation type of encoding is operative, it encodes and outputs the number of filler runs between the last two processed spines, or between the last spine and the head or subhead. We note here that a distinct filler code is also required to indicate the condition of no filler runs between two spines, or between a spine and a head or subhead. All successive spines in the blob are retrieved, encoded, and outputted as just indicated. After outputting the last run in the blob, the blob end code is outputted.

After outputting a blob as described above, the CODE subroutine then returns to the ISTK stack entry following the head item of the blob last processed, and searches sequentially until the next head or subhead is found. If another head or subhead is found, it and the other runs constituting the blob are encoded and outputted as indicated above. This process of searching for the next head or subhead, and tracing through the stack for the various runs comprising a blob, is continued until all the blobs are encoded.

OUT SUBROUTINE (BLOCK 60)

The OUT subroutine extracts a variable number of bits from the right hand end of a given word, and packs them into the next available bit positions of a one word buffer. Whenever the one word buffer is filled, the subroutine writes it onto an output device, and clears the buffer word.

The OUT subroutine is called by the OPT subroutine to output the "signal" bits, and by the HUF subroutine to output codebooks, and by the CODE subroutine to output the codewords for the blob parameters. (Block 70).

BITPK PACKAGE (BLOCK 65)

The BITPK package is called by the OUT subroutine to extract bit data from a computer word, and to place bit data into a computer word.

PROGRAM TO GENERATE APPROXIMATE IMAGES

This program operates upon a stack containing encoded blob data, and constructs a series of brightness level values which correspond to the digitized samples of an image which approximates a given input image. The stack is of the same form as the ISTK stack produced by the aforementioned LINES subroutine, which includes the first and second approximation processes. The stack contains one entry for each image scan line, and one entry for each run of contiguous like-brightness-level pels in the image, where such runs are assumed to extend over one image scan line only. The lines and runs entries are in a line-by-line, left-to-right scan order. In this implementation, each stack entry comprises a 36 bit word, containing the following fields, progressing from the high order to the low-order bit positions.

| Number of Bits | Parameter | Description |
| --- | --- | --- |
| 1 | | This indicates the type of ISTK stack entry; a 0 indicates a "runs" entry, and a 1 indicates a "lines" entry. |
| 4 | IGL | This is the gray or brightness level. |
| 2 | ITYP | This indicates the type of runs item, as follows:<br>0 Filler run.<br>1 Exactly encoded run, other than the first exactly encoded run in a blob.<br>2 First exactly encoded run in a blob.<br>3 A header tail run that is encoded in grouped form. |
| 9 | ICON | This is a pointer to the ISTK stack entry of the next run in the blob, relative to the position in the ISTK stack of this run. If there is no succeeding run, this field has a value of 0. |
| 10 | IXL | This is the number of pels from the left end of the line up to and including the left end of the run. |
| 10 | IXR | This is the number of pels from the left end of the line up to and including the right end of the run. |

The generation of the approximated image proceeds as follows. First, the program initializes a number of program variables, and reads in a number of numeric run-time parameters as indicated below.

| Parameter | Description |
| --- | --- |
| NSAM | This is the number of samples or pels per image line. |
| INC | This is the absolute value of the number of pels difference between the left end of two successive runs in a blob, and between the right ends of two successive runs in a blob, as employed in the encoding process. |
| IPOX | This indicates the type of image encoding embodied in the stack entries, as follows:<br>1 The first approximation type of encoding only applies, i.e., all the blob head and tail runs in the original image are encoded in a grouped form.<br>2 The second approximation type of encoding applies, in which only a subset of the blob runs are encoded exactly, and the remaining runs, called fillers are encoded in a grouped form. In addition, if ISNOW is not zero, then the first approximation type of encoding applies as well. |
| ISNOW | This is the maximum number of pels in a blob head or tail that are encoded in a grouped form if the first approximation type of encoding applies. |
| INL | This amount, when added to the left end position of the first or last exactly encoded run in a blob respectively, gives the extreme leftmost possible position of the left end of an approximated head or tail respectively. This amount may be positive or negative. |
| INR | This amount, when added to the right end position of the first or last exactly encoded run in a blob respectively, gives the extreme rightmost possible position of the right end |

-continued

| Parameter | Description |
|---|---|
| | of an approximated head or tail respectively. This amount may be positive or negative. |
| NSNOW | This is the total number of pels in the head and tail runs encoded in a grouped form where the first approximation type of encoding applies. |
| IBACK | This is the brightness level of the background pels, determined in the encoding process to yield the minimum encoded bits. |
| INTERP | This indicates the type of interpolation to use in generating the approximate filler runs. It has the values of 0 and 1 for a linear and a special non-linear interpolation respectively. |

After reading in the above parameter values, the program then reads in and processes a stack, a segment at a time, from an appropriate peripheral device in which it is stored. Next, if the second approximation process applies, the program identifies each filler entry in the stack segment, computes the leftmost left end and the rightmost right end of the approximated filler run, and enters them into the associated stack entry. It does this by interpolating in a linear or a special non-linear fashion between the left ends, and between the right ends of two successive spines in each blob, for all such pairs of spines separated by at least one filler run. The fillers so approximated may be shortened by subsequent processing as described further below.

The program then builds an image line at a time in the LNB array, which has one word for the brightness level of each pel in an image line. Initially the entire LNB array is set equal to the background level. Then the program progresses through the ISTK stack entries for the current image line, and processes each entry according to the type of the entry, as follows.

(a) For an exactly encoded run, the corresponding entries in the LNB array from the left to the right ends of the run are set equal to the non-background level.

(b) If the first approximation process applies and the exactly encoded run is also the first exactly encoded run in a blob, the program determines if an approximated head run to the blob can be generated in the prior image line, so that the head run attaches to the given blob satisfying certain conditions, and so that it does not violate any flanking blob structures. To determine the latter the program performs various tests on an array called LNA, which contains the brightness levels of the pels for the image line immediately prior to the one being built in the array LNB. Since these tests are best understood in immediate context, the description of them is reserved for the attached detailed fully commented program listing. If indeed an approximated head can be generated, it is entered into the LNA array, and the number of pels in the approximated head is deducted from the parameter NSNOW. The original value of NSNOW is the total number of pels in those blob heads and tails in the original image which were encoded in a grouped form. If NSNOW reduces to zero during the execution of the program, generation of approximated heads and tails ceases.

(c) For a filler run, the program performs various tests on the flanking non-background runs in the LNB array, and if necessary shortens the filler run. If the filler run is not thus entirely eliminated, the program enters the approximated run into the LNB array.

(d) After performing all of the processing indicated above for a current image line, the program progresses through the ISTK stack entries for the prior image line, and determines if there are any exactly encoded runs in the prior image line which are also the last exactly encoded runs in a blob. For each such run, the program determines if an approximated tail run to the blob can be generated in the current image line in the array LNB, so that the tail run attaches to the given blob satisfying certain conditions, and so that it does not violate any flanking blob structures. To determine the latter, the program performs various tests on the LNB array. If an approximated tail can be generated, it is entered into the LNB array, and the number of pels in the approximated tail is deducted from the parameter NSNOW.

At the end of the above processing for any particular line, the program writes out the LNA array to a peripheral device, moves the LNB array to the LNA array, and updates the pointers to the ISTK stack positions of the current and prior image lines. The ISTK stack segments are originally encoded so that they contain integral image lines, and so that blobs do not span across ISTK stack segments. In generation, the program does not generate approximate heads attaching to runs in the first image line in a segment, and it does not generate approximate tails attaching to runs in the last image line in a segment. The processing of each ISTK stack segment ends with writing out the last image line in the segment. In effect, segmenting of the ISTK stack permits running the program in a small amount of computer main memory, but causes the images to be processed in slices where each blob is confined to be within one such slice. In general, this increases the number of blobs, thereby yielding a less efficient encoding than if the entire image is treated as one entity. The maximum encoding efficiency can be obtained by using an ISTK stack which is at least equal in size to the number of image lines plus the number of runs plus 1.

DETAILED PROGRAM LISTING

Program listings for each of the functional blocks described above appear as an appendix.

As noted previously, all of the programs except the BITPK subroutine are written in FORTRAN; BITPK is written in Honeywell 6000 assembly language code.

MODIFICATIONS AND EXTENSIONS

While the use in accordance with the present invention of the blob identification and coding methods and apparatus in high fidelity images has been emphasized, no such use need be exclusive. Lower fidelity images of the type commonly used in standard facsimile transmission systems may profit from the use of the present inventive methods and apparatus as well.

While the preferred embodiment of the present invention has been described in terms of a programmed general purpose computer, it is clear to those skilled in the art that equivalent special purpose apparatus may be constructed which is functionally equivalent to the general purpose programmed machine embodiment actually described.

While particular parameter values for defining codes and connectivity constraints have been used in the description above, it is clear that no such values are fundamental to the present invention. For example, in particular cases blobs may be defined using any convenient value for the parameter J. Similarly, though horizontal scanning has been emphasized, it should be understood that no such limitation is fundamental to the present invention. In particular cases vertical or other scanning regimes may be followed.

The particular codes described, e.g., Huffman, Elias or the new Huffman Modulo Codes, should be considered merely to be typical. Other codes may be used where the statistics of the image subject matter or other factors suggest such use. Though the data to be processed by the several program blocks described in detail above has been assumed to be stored on a disk or tape file, no such storage is fundamental to the present invention. In particular, the scanned data may be read in and processed in real time. The particular machine and programing languages recited in the preferred embodiments likewise may be replaced by other particular languages and machines, depending upon availability, desired operating speed, economics and other generally relevant data processing considerations.

While the present description has been presented in terms of two-valued images, it is clear that images having any number of brightness levels (and/or colors) may be accommodated. Thus, the grouping of runs of like brightness level (and/or color) is accomplished for each such level (and/or color), thereby to identify blobs. In the above-described detailed embodiment, this requires one additional code per blob for specifying the brightness level (and/or color) of the blob. Minimal statistical encoding for these codes proceeds as described previously for other blob parameters. Similarly, though two-dimensional images and scanning were described, three-dimensional images and scanning may also readily be used.

Additional background and theoretical factors relating to the general subject matter of the present invention may be found in Frank, "High Fidelity Encoding of Two-Level, High Resolution Images," *Proceedings 1973 International Conference on Communications, IEEE*, June 1973, which is hereby incorporated in its entirety by reference.

APPENDIX

```
C       MAIN CONTROL PROGRAM
C
C
        COMMON /COM1/ IBACK,IN(1024),INC,IPOX,IRTN,ISNOW,ISTK(10000),
     1                ISTKSZ,IWL,IWR,IWT,IWW,IY,LENMAX(2),LSTK,
     3                NFILL(18,2),NHEAD(43,2),NINC(49,2),NPOS(20000,2),
     4                NSNOW(2)
        DIMENSION     LA1(257),LA2(257),LA3(257),LA4(257),LA5(257),
     1                LB1(257),LB2(257),LB3(257),LB4(257),LB5(257),
     2                LC1(257),LC2(257),LC3(257),LC4(257),LC5(257)
        EQUIVALENCE   (ISTK(1),K)
C
C
C****   READ RUN-TIME PARAMETERS :
C
        READ 9999, NLIN, NSAM, IWT, IWB, IWL, IWR, IPOX, ISNOW, IBACK,
     1             INC, ISTKSZ
 9999   FORMAT (10I4,I6)
C
C****   INITIALIZE PROGRAM VARIABLES :
C
        DO 4 N=1,2
        NSNOW(N)=0
        DO 1 M=1,18
    1   NFILL(M,N)=0
        DO 2 M=1,43
    2   NHEAD(M,N)=0
        DO 3 M=1,49
    3   NINC(M,N)=0
        DO 4 M=1,20000
    4   NPOS(M,N)=0
        IRTN=1
        K=2
        LSTK=0
        LA1(257)=0
        LB1(257)=0
C       IS WINDOW AT TOP OF IMAGE ?
   20   IF(IWT.NE.0)GO TO 30
   25   IWT=1
C       IS WINDOW AT BOTTOM OF IMAGE ?
   30   IF(IWB.NE.0)GO TO 40
   35   IWB=NLIN
C       IS WINDOW AT LEFT OF IMAGE ?
   40   IF(IWL.NE.0)GO TO 50
   45   IWL=1
C       IS WINDOW AT RIGHT OF IMAGE ?
   50   IF(IWR.NE.0)GO TO 60
   55   IWR=NSAM
```

```
C        COMPUTE WIDTH OF WINDOW :
      60 IWW=IWR-IWL+1
C        SET INPUT LINE NUMBER TO TOP OF WINDOW :
         IY=IWT
C        INITIALIZE INDEX IALT WHICH ALTERNATES LINES ARRAYS :
         IALT=1
C
C****    READ A LINE AT A TIME AND PROCESS :
C
     200 READ (01) IN
C
C****    CALL LINES SUBROUTINES WITH ARGUMENTS DEPENDING ON IALT, AS FOLLOWS :
C
C          1ST - 5TH ARGUMENTS CONTAIN DATA PERTAINING TO THE SECOND LINE
C          PRIOR TO THE CURRENT LINE BEING PROCESSED.
C
C          6TH - 10TH ARGUMENTS CONTAIN DATA PERTAINING TO THE FIRST LINE
C          PRIOR TO THE CURRENT LINE BEING PROCESSED.
C
C          11TH - 15TH ARGUMENTS ARE TO CONTAIN DATA PERTAINING TO CURRENT
C          LINE BEING PROCESSED.
C
     205 IALT=MOD(IALT,3)+1
         GO TO (211,212,213), IALT
     211 CALL LINES (LA1,LA2,LA3,LA4,LA5,LB1,LB2,LB3,LB4,LB5,
        1             LC1,LC2,LC3,LC4,LC5)
         GO TO (215,235,236), IRTN
     212 CALL LINES (LB1,LB2,LB3,LB4,LB5,LC1,LC2,LC3,LC4,LC5,
        1             LA1,LA2,LA3,LA4,LA5)
         GO TO (215,235,236), IRTN
     213 CALL LINES (LC1,LC2,LC3,LC4,LC5,LA1,LA2,LA3,LA4,LA5,
        1             LB1,LB2,LB3,LB4,LB5)
         GO TO (215,235,236), IRTN
C        UPDATE INPUT LINE NUMBER :
     215 IY=IY+1
C        ARE THERE ANY LINES IN THE WINDOW YET TO BE INPUTTED ?
     220 IF(IY.LE.IWB)GO TO 200
C        SET INDEX TO RETURN TO 235, AND THEN GO TO LINES SUBROUTINE TO
C        FINISH PROCESSING NEXT TO BOTTOM LINE IN IMAGE :
     230 IRTN=2
         GO TO 205
C        SET INDEX TO RETURN TO 236, AND THEN GO TO LINES SUBROUTINE TO
C        FINISH PROCESSING BOTTOM LINE IN IMAGE :
     235 IRTN=3
         GO TO 205
C        WRITE OUT A NEGATIVE WORD TO SIGNIFY END OF ISTK STACK SEGMENTS,
C        AND CLOSE STACK FILE :
     236 NEG=-1
         WRITE (02) NEG
         REWIND 02
C
C****    CALL OPT SUBROUTINE TO DETERMINE OPTIMAL CODES AND OUTPUT
C        CODEBOOKS, IF REQUIRED :
C
         CALL OPT
C
C****    CALL CODE SUBROUTINE TO ENCODE AND OUTPUT BLOBS :
C
         CALL CODE
C
C****    END OF JOB :
C
         STOP
         END
         SUBROUTINE LINES (LA1,LA2,LA3,LA4,LA5,LB1,LB2,LB3,LB4,LB5,
        1                  LC1,LC2,LC3,LC4,LC5)
C
C
         COMMON /COM1/ IBACK,IN(1024),INC,IPOX,IRTN,ISNOW,ISTK(10000),
        1              ISTKSZ,IWL,IWR,IWT,IWW,IY,LENMAX(2),LSTK,
        3              NFILL(18,2),NHEAD(43,2),NINC(49,2),NPOS(20000,2),
        4              NSNOW(2)
```

```
        DIMENSION    LA1(257),LA2(257),LA3(257),LA4(257),LA5(257),
       1             LB1(257),LB2(257),LB3(257),LB4(257),LB5(257),
       2             LC1(257),LC2(257),LC3(257),LC4(257),LC5(257),
       3             IPGLOB(2)
        EQUIVALENCE  (ISTK(1),K)
        DATA         IOUT /0/, NPRE /2/, NEG /O777777777777/
C
C
C**** INITIALIZE :
C
C       IS SIGNAL TO OUTPUT ISTK STACK SET YET ?
      1 IF(IOUT.EQ.0)GO TO (6,293,500), IRTN
C       UPDATE OUTPUT ISTK SIGNAL :
      2 IOUT=IOUT-1
C       BRANCH ON VALUE OF IRTN SIGNAL :
      3 GO TO (10,293,500), IRTN
C       BRANCH ON VALUE OF IRTN SIGNAL :
C       IS THERE ROOM ON ISTK STACK FOR SECOND AND FIRST PREVIOUS LINES
C       AND A CURRENT LINE OF MAXIMUM LENGTH ?
      6 IF((K+LA1(257)+LB1(257)+259).LE.ISTKSZ)GO TO 10
C       SET OUTPUT ISTK SIGNAL TO 2 :
      7 IOUT=2
C       RESET INPUT SAMPLE POINTER TO FIRST SAMPLE IN WINDOW :
     10 IX=IWL
C       RESET POINTER TO CURRENT LINE ARRAYS TO STARTING POSITION :
     11 LC=1
C       RESET STARTING TEST POSITION POINTER TO START OF FIRST
C       PREVIOUS LINE ARRAYS :
     15 LBST=1
C       SET POINTER TO FIRST PREVIOUS LINE ARRAYS TO STARTING TEST
C       POSITION :
     20 LB=LBST
C
C**** IDENTIFY RUNS :
C
C       SET LEFT END OF RUN EQUAL TO INPUT SAMPLE POINTER :
     25 IXL=IX-1
C       GET GRAY LEVEL OF NEXT INPUT SAMPLE :
     30 LEV=IN(IX)
C       UPDATE INPUT SAMPLE POINTER :
     35 IX=IX+1
C       IS THIS END OF INPUT LINE ?
     40 IF(IX.GT.IWR) GO TO 50
C       IS GRAY LEVEL OF NEXT INPUT SAMPLE EQUAL TO GRAY LEVEL OF
C       PREVIOUS SAMPLE ?
     45 IF(IN(IX).EQ.LEV) GO TO 35
C       SET RIGHT END OF RUN EQUAL TO INPUT SAMPLE POINTER - 2 :
     50 IXR=IX-2
C       IS GRAY LEVEL OF NEXT INPUT SAMPLE EQUAL TO BACKGROUND LEVEL ?
     70 IF(LEV.NE.IBACK) GO TO 85
C       IS THIS END OF INPUT LINE ?
     75 IF(IX.LE.IWR) GO TO 25
C       SET NUMBER OF ITEMS IN CURRENT LINE INTO END OF LC1 ARRAY :
     80 LC1(257)=LC-1
        GO TO 293
C       ARE THE CURRENT LINE ARRAYS FULL ?
     85 IF(LC.LE.256) GO TO 95
C       PRINT ERROR MESSAGE AND ABORT PROGRAM :
     90 WRITE (06,9999) IY
   9999 FORMAT(21H0LC ARRAYS FULL, LINE,I4)
        CALL EXIT
C       SET GRAY LEVEL, LEFT END OF RUN AND RIGHT END OF RUN IN NEXT
C       ENTRIES OF CURRENT LINE ARRAYS :
     95 LC2(LC)=LEV
        LC4(LC)=IXL
        LC5(LC)=IXR
C       IS THERE ROOM ON THE ISTK STACK FOR SECOND AND FIRST PREVIOUS
C       LINE AND CURRENT LINE OF MAXIMUM LENGTH ?
    100 IF(IOUT.EQ.2) GO TO 250
C
C**** TEST FOR CONNECTION OF CURRENT RUN TO A RUN IN PREVIOUS LINE :
C
C       HAVE ALL RUNS IN PREVIOUS LINE BEEN TESTED FOR CONNECTION TO
C       CURRENT RUN ?
```

```
      200 IF(LB.GT.LB1(257))GO TO 250
C     IS NEXT RUN IN PREVIOUS LINE SAME GRAY LEVEL AS CURRENT RUN ?
      205 IF(LB2(LB).NE.LEV)GO TO 240
C     IS NEXT RUN IN PREVIOUS LINE ALREADY CONNECTED TO A RUN IN
C     THE CURRENT LINE ?
      210 IF(LB1(LB).NE.0)GO TO 240
C     IS LEFT END OF CURRENT RUN MORE THAN THE AMOUNT INC TO THE LEFT
C     OF THE LEFT END OF THE NEXT RUN IN THE PREVIOUS LINE ?
      215 IF((LB4(LB)-IXL).GT.INC)GO TO 250
C     IS LEFT END OF CURRENT RUN MORE THAN THE AMOUNT INC TO THE RIGHT
C     OF THE LEFT END OF THE NEXT RUN IN THE PREVIOUS LINE ?
      220 IF((IXL-LB4(LB)).GT.INC)GO TO 235
C     IS RIGHT END OF CURRENT RUN MORE THAN THE AMOUNT INC TO THE LEFT
C     OF THE RIGHT END OF THE NEXT RUN IN THE PREVIOUS LINE ?
      225 IF((LB5(LB)-IXR).GT.INC)GO TO 250
C     IS RIGHT END OF CURRENT RUN MORE THAN THE AMOUNT INC TO THE RIGHT
C     OF THE RIGHT END OF THE NEXT RUN IN THE PREVIOUS LINE ?
      230 IF((IXR-LB5(LB)).GT.INC)GO TO 240
          GO TO 260
C     SET STARTING TEST POSITION POINTER TO THE RUN TO THE RIGHT OF THE
C     ONE JUST TESTED IN THE FIRST PREVIOUS LINE ARRAYS :
      235 LBST=LB+1
C     UPDATE POINTER TO NEXT RUN IN PREVIOUS LINE :
      240 LB=LB+1
          GO TO 200
C
C**** ITEM DOES NOT CONNECT TO A PREVIOUS ITEM, ENTER IN LINES ARRAYS :
C
C     SET TYPE CODE OF NEXT ENTRY OF CURRENT LINE ARRAY LC3 TO INDICATE
C     RUN IS A HEAD :
      250 LC3(LC)=51
C     UPDATE NUMBER OF HEADS BY GRAY LEVEL BY LENGTH :
      255 IF(LEN.GT.40)GO TO 256
          NHEAD(LEN,LEV+1)=NHEAD(LEN,LEV+1)+1
          GO TO 280
      256 NDX=43
          IF(LEN.LT.201) NDX=42
          IF(LEN.LT.73) NDX=41
          NHEAD(NDX,LEV+1)=NHEAD(NDX,LEV+1)+1
          GO TO 280
C
C**** ITEM CONNECTS TO A PREVIOUS ITEM; ENTER ITEM IN LINES ARRAYS :
C
C     SET CONNECTION CODE OF NEXT ITEM IN PREVIOUS LINE EQUAL TO
C     POINTER TO CURRENT ITEM :
      260 LB1(LB)=LC
C     IS THIS A SECOND APPROXIMATION TYPE ENCODING ?
      261 IF(IPOX.NE.2)GO TO 265
C     SET TYPE CODE IN NEXT RUN IN CURRENT LINE ARRAY TO NEGATIVE :
      262 LC3(LC)=-1
          GO TO 280
C     COMPUTE THE INCREMENT CODE :
      265 INCODE=(IXL-LB4(LB)+INC)*(INC+INC+1)+IXR-LB5(LB)+INC+1
C     SET TYPE CODE OF NEXT ENTRY OF CURRENT LINE ARRAY LC3 EQUAL TO
C     INCREMENT CODE :
      270 LC3(LC)=INCODE
C     UPDATE NUMBER OF INCREMENTS BY GRAY LEVEL BY INCREMENT CODE :
      275 NINC(INCODE,LEV+1)=NINC(INCODE,LEV+1)+1
C     SET CONNECTION CODE OF NEXT RUN IN CURRENT LINE ARRAY TO
C     INITIAL VALUE OF ZERO :
      280 LC1(LC)=0
C     IS THIS END OF THE INPUT LINE ?
      290 IF(IX.GT.IWR)GO TO 292
C     UPDATE POINTER TO CURRENT LINE ARRAYS :
      291 LC=LC+1
          GO TO 20
C     SET NUMBER OF ITEMS IN CURRENT LINE INTO END OF LC1 ARRAY :
      292 LC1(257)=LC
C     IS THIS AN EXACT ENCODING ?
      293 IF(IPOX.EQ.0)GO TO 500
C
C**** AT END OF LINE, ADJUST FOR APPROXIMATE ENCODINGS :
C
```

```
C     RESET POINTER TO FIRST PREVIOUS LINE ARRAYS TO STARTING POSITION :
  300 LB=1
      GO TO 310
C     UPDATE POINTER TO FIRST PREVIOUS LINE ARRAYS :
  305 LB=LB+1
C     HAVE ALL RUNS IN FIRST PREVIOUS LINE BEEN TESTED ?
  310 IF(LB.GT.LB1(257))GO TO 500
C     BRANCH ACCORDING TO TYPE OF NEXT ITEM IN FIRST PREVIOUS LINE :
C           IF ITEM IS EMPTY, GO TO 305
C           IF ITEM IS AN INCREMENT OR SUBHEAD, GO TO 320
C           IF ITEM IS A HEAD, GO TO 400
  315 IF(LB3(LB).EQ.0)GO TO 305
      IF(LB3(LB).EQ.51)GO TO 400
C
C**** ITEM IS AN INCREMENT OR SUBHEAD :
C
C     IS NEXT RUN IN FIRST PREVIOUS LINE A TAIL ?
  320 IF(LB1(LB).NE.0)GO TO 305
C     COMPUTE LENGTH OF TAIL OF NEXT RUN IN FIRST PREVIOUS LINE :
  325 LEN=LB5(LB)-LB4(LB)+1
C     IS TAIL TO BE ELIMINATED, I.E. IS LENGTH OF TAIL LESS THAN OR
C     EQUAL TO THE AMOUNT ISNOW ?

330 IF(LEN.GT.ISNOW)GO TO 305
C     COMPUTE GRAY LEVEL OF TAIL + 1 :
  335 LEV=LB2(LB)+1
C     UPDATE NUMBER OF REMOVED PELS BY GRAY LEVEL :
  336 NSNOW(LEV)=NSNOW(LEV)+LEN
C     IS THIS RUN A SUBHEAD ?
  340 IF(LB3(LB).EQ.50) GO TO 345
C     IS THIS A SECOND APPROXIMATION TYPE ENCODING ?
      IF(IPOX.EQ.2) GO TO 370
      GO TO 360
C
C**** ITEM IS A SUBHEAD :
C
C     ADJUST THE NUMBER OF HEADS BY GRAY LEVEL BY LENGTH :
  345 IF(LEN.GT.16)GO TO 346
      NHEAD(LEN,LEV)=NHEAD(LEN,LEV)-1
      GO TO 350
  346 IF(LEN.LE.32)NHEAD(17,LEV)=NHEAD(17,LEV)-1
      IF(LEN.GT.32)NHEAD(18,LEV)=NHEAD(18,LEV)-1
C     ELIMINATE NEXT RUN ON THE FIRST PREVIOUS LINE :
  350 LB3(LB)=0
      GO TO 305
C
C**** ITEM IS AN INCREMENT :
C
C     GET INCREMENT CODE OF NEXT ITEM IN FIRST PREVIOUS LINE :
  360 INCODE=LB3(LB)
C     ADJUST NUMBER OF INCREMENT CODES BY GRAY LEVEL :
  365 NINC(INCODE,LEV)=NINC(INCODE,LEV)-1
C     RESET POINTER TO SECOND PREVIOUS LINE ARRAYS TO STARTING POSITION :
  370 LA=1
C     DOES NEXT RUN IN SECOND PREVIOUS LINE CONNECT TO THE RUN TO BE
C     REMOVED IN THE FIRST PREVIOUS LINE ?
  375 IF(LA1(LA).EQ.LB)GO TO 385
C     UPDATE POINTER TO SECOND PREVIOUS LINE ARRAYS :
  380 LA=LA+1
      GO TO 375
C     CHANGE NEXT ITEM IN SECOND PREVIOUS LINE TO NOT CONNECT TO
C     NEXT ITEM IN FIRST PREVIOUS LINE :
  385 LA1(LA)=0
      GO TO 350
C
C**** ITEM IS A HEAD :
C
C     GET LENGTH OF HEAD IN FIRST PREVIOUS LINE :
  400 LEN=LB5(LB)-LB4(LB)+1
C     IS HEAD TO BE ELIMINATED, I.E. IS LENGTH OF HEAD LESS THAN OR
C     EQUAL TO THE AMOUNT ISNOW ?
  405 IF(LEN.GT.ISNOW)GO TO 305
C     COMPUTE GRAY LEVEL OF HEAD + 1 :
  410 LEV=LB2(LB)+1
```

```
C     UPDATE NUMBER OF REMOVED PELS BY GRAY LEVEL :
  415 NSNOW(LEV)=NSNOW(LEV)+LEN
C     IS HEAD IN FIRST PREVIOUS LINE CONNECTED TO A RUN IN CURRENT LINE ?
  420 IF(LB1(LB).NE.0)GO TO 435
      GO TO 345
C     GET POINTER TO ITEM CONNECTED TO IN CURRENT LINE :
  435 LC=LB1(LB)
C     IS THIS A SECOND APPROXIMATION TYPE ENCODING ?
  436 IF(IPOX.EQ.2) GO TO 450
C     GET INCREMENT CODE OF ITEM CONNECTED TO IN CURRENT LINE :
  440 INCODE=LC3(LC)
C     ADJUST NUMBER OF INCREMENT CODES BY GRAY LEVEL :
  445 NINC(INCODE,LEV)=NINC(INCODE,LEV)-1
C     GET LENGTH OF RUN CONNECTED TO IN CURRENT LINE :
  450 LEG=LC5(LC)-LC4(LC)+1
C     ADJUST NUMBER OF HEADS BY GRAY LEVEL BY LENGTH :
  455 IF(LEG.GT.16)GO TO 456
      NHEAD(LEG,LEV)=NHEAD(LEG,LEV)+1
      GO TO 460
  456 IF(LEG.LE.32)NHEAD(17,LEV)=NHEAD(17,LEV)+1
      IF(LEG.GT.32)NHEAD(18,LEV)=NHEAD(18,LEV)+1
C     CHANGE RUN CONNECTED TO IN CURRENT LINE TO A SUBHEAD :
  460 LC3(LC)=50
      GO TO 345
C
C**** BUILD ISTK, OUTPUT ISTK WHEN FULL :
C
C     RESET POINTER TO SECOND PREVIOUS LINE ARRAYS TO STARTING POSITION :
  500 LA=1
C     IS THIS THE FIRST OR SECOND TIME HERE, I.E. IS THE SECOND PREVIOUS
C     LINE NOT STARTED YET ?
  501 IF(NPRE.EQ.0)GO TO 503
C     UPDATE SIGNAL INDICATING THERE IS NO SECOND PREVIOUS LINE YET :
  502 NPRE=NPRE-1
C     SET NUMBER OF PELS SCANNED PRIOR TO CURRENT LINE TO INITIAL VALUE :
      NPE=-IWW
C     SET GLOBAL POSITION OF RIGHT END OF PREVIOUS BLOB HEAD BY GRAY
C     LEVEL TO INITIAL VALUE :
      IPGLOB(1)=0
      IPGLOB(2)=0
      GO TO 700
C     UPDATE NUMBER OF PELS SCANNED PRIOR TO THIS NEXT LINE TO BE PUT
C     ON THE ISTK STACK :
  503 NPE=NPE+IWW
C     IS THE SECOND PREVIOUS LINE EMPTY ?
      IF(LA1(257).NE.0)GO TO 505
C     SET NEW LINE WORD ON ISTK STACK TO ALL 1'S :
  504 ISTK(K)=NEG
      GO TO 525
C     PUT NEW LINE WORD ON ISTK STACK :
  505 ISTK(K)=-LA1(257)
      GO TO 525
C     UPDATE POINTER TO SECOND PREVIOUS LINE ARRAYS :
  520 LA=LA+1
C     UPDATE ISTK STACK POINTER :
  525 K=K+1
C     HAVE ALL RUNS IN SECOND PREVIOUS LINE BEEN PUT ON ISTK STACK ?
  530 IF(LA.GT.LA1(257))GO TO 700
C     IS NEXT ITEM IN SECOND PREVIOUS LINE EMPTY ?
  535 IF(LA3(LA).NE.0)GO TO 550
C     ENTER EMPTY ITEM IN ISTK STACK :
  540 ISTK(K)=0
      GO TO 520
C     GET POINTER RELATIVE TO NEXT RUN IN SECOND PREVIOUS LINE TO ISTK
C     STACK POSITION OF NEXT RUN IN BLOB, IF ANY :
  550 ICON=0
      IF(LA1(LA).EQ.0)GO TO 551
      ICON=LA1(257)-LA+LA1(LA)+1
      IF(ICON.GE.512) CALL EXIT
      ICON=ICON*1048576
C     BRANCH ON TYPE OF NEXT RUN IN SECOND PREVIOUS LINE :
C          IF RUN IS A HEAD OR SUBHEAD, GO TO 570
C          IF RUN IS AN INCREMENT, GO TO 600
  551 IF(LA3(LA)-50)600,570,570
```

```
C         ENTER HEAD OR SUBHEAD IN THE ISTK STACK :
    570 ISTK(K)=LA2(LA)*2147483648+ICON+LA4(LA)*1024+LA5(LA)
C         GET GLOBAL VALUE OF THE LEFT END OF HEAD :
    571 IGLOB=NPE+LA4(LA)-IWL+2
C         GET NUMBER OF PELS FROM RIGHT END OF HEAD OF PREVIOUS BLOB OF SAME
C         LEVEL TO LEFT END OF HEAD OF THIS BLOB :
    572 LENR=IGLOB-IPGLOB(LEV)
C         IS POSITION GREATER THAN 20000 ?
    573 IF(LENR.LE.20000) GO TO 574
C         IF POSITION IS GREATER THAN 20000, PRINT ERROR MESSAGE
C         AND ABORT PROGRAM :
        WRITE (06,9998)
   9998 FORMAT (16H0POS EXCEEDS MAX)
        CALL EXIT
C         IF POSITION IS GREATER THAN MAXIMUM POSITION, UPDATE MAXIMUM POSITION
    574 IF(LENR.GT.LENMAX(LEV)) LENMAX(LEV)=LENR
C         UPDATE NUMBER OF POSITIONS BY LENGTH BY GRAY LEVEL :
    575 NPOS(LENR,LEV)=NPOS(LENR,LEV)+1
C         SET GLOBAL VALUE OF RIGHT END OF HEAD BY GRAY LEVEL :
    576 IPGLOB(LEV)=NPE+LA5(LA)-IWL+2
C         IS THIS A SECOND APPROXIMATION TYPE ENCODING ?
    577 IF(IPOX.NE.2)GO TO 520
C         GET POINTER RELATIVE TO START OF NEXT LINE TO NEXT RUN IN BLOB,
C         IF ANY :
    580 ICON2=LA1(LA)
C         IS HEAD IN SECOND PREVIOUS LINE CONNECTED TO A RUN IN FIRST
C         PREVIOUS LINE ?
    585 IF(ICON2.EQ.0) GO TO 520
C         ENTER X COORDINATES OF LEFT AND RIGHT ENDS OF HEAD INTO RUN
C         CONNECTED TO IN FIRST PREVIOUS LINE AND SET FILL COUNT TO 1 :
    590 LB4(ICON2)=LB4(ICON2)+LA4(LA)*1024+1048576
        LB5(ICON2)=LB5(ICON2)+LA5(LA)*1024
        GO TO 520
C
C****    ITEM IS AN INCREMENT :
C
C         IS THIS A SECOND APPROXIMATION TYPE ENCODING ?
    600 IF(IPOX.NE.2)GO TO 660
C         GET POINTER RELATIVE TO START OF NEXT LINE TO NEXT RUN IN BLOB,
C         IF ANY :
    605 ICON2=LA1(LA)
C         GET X COORDINATES OF LEFT AND RIGHT ENDS OF PREVIOUS SPINE, AND
C         FILL COUNT, AND GRAY LEVEL + 1 :
    610 ISXL=MOD(LA4(LA)/1024,1024)
        ISXR=LA5(LA)/1024
        IFILL=LA4(LA)/1048576
        LEV=LA2(LA)+1
C         IS RUN IN SECOND PREVIOUS LINE CONNECTED TO A RUN IN FIRST
C         PREVIOUS LINE ?
    615 IF(ICON2.EQ.0)GO TO 650
C         GET X COORDINATES OF LEFT AND RIGHT ENDS OF RUN CONNECTED TO
C         IN FIRST PREVIOUS LINE :
    620 IXL=LB4(ICON2)
        IXR=LB5(ICON2)
C         DOES RUN IN FIRST PREVIOUS LINE CONNECT TO THE PREVIOUS SPINE ?
    625 IF((ISXL-IXL).GT.INC)GO TO 640
        IF((IXL-ISXL).GT.INC)GO TO 640
        IF((ISXR-IXR).GT.INC)GO TO 640
        IF((IXR-ISXR).GT.INC)GO TO 640
C         UPDATE FILL COUNT AND PUT ALONG WITH X COORDINATES OF LEFT AND
C         RIGHT ENDS OF PREVIOUS SPINE IN RUN IN FIRST PREVIOUS LINE :
    630 LB4(ICON2)=LB4(ICON2)+ISXL*1024+(IFILL+1)*1048576
        LB5(ICON2)=LB5(ICON2)+ISXR*1024
C         ENTER FILLER ITEM IN ISTK STACK :
    635 ISTK(K)=LA2(LA)*2147483648+ICON
      1          +MOD(LA4(LA),1024)*1024+MOD(LA5(LA),1024)
        GO TO 520
C         ENTER X COORDINATES OF LEFT AND RIGHT ENDS OF RUN IN SECOND
C         PREVIOUS LINE INTO RUN CONNECTED TO IN FIRST PREVIOUS LINE,
C         AND SET FILL COUNT TO 1 :
    640 LB4(ICON2)=LB4(ICON2)+MOD(LA4(LA),1024)*1024+1048576
        LB5(ICON2)=LB5(ICON2)+MOD(LA5(LA),1024)*1024
C         UPDATE NUMBER OF FILLER ITEMS BY LENGTH BY GRAY LEVEL :
```

```
      650 IF(IFILL.GT.16)GO TO 651
          NFILL(IFILL,LEV)=NFILL(IFILL,LEV)+1
          GO TO 655
      651 IF(IFILL.LE.32) NFILL(17,LEV)=NFILL(17,LEV)+1
          IF(IFILL.GT.32) NFILL(18,LEV)=NFILL(18,LEV)+1
C         GET X COORDINATES OF LEFT AND RIGHT ENDS OF RUN IN SECOND
C         PREVIOUS LINE :
      655 IXL=MOD(LA4(LA),1024)
          IXR=MOD(LA5(LA),1024)
C         GET INCREMENT CODE :
      660 INCODE=(IXL-ISXL+INC)*(INC+INC+1)+IXR-ISXR+INC+1
C         UPDATE NUMBER OF INCREMENTS BY INCREMENT CODE BY GRAY LEVEL :
      665 NINC(INCODE,LEV)=NINC(INCODE,LEV)+1.
C         ENTER INCREMENT ITEM ON ISTK STACK :
      670 ISTK(K)=LA2(LA)*2147483648+536870912+ICON+IXL*1024+IXR
          GO TO 520
C         ENTER INCREMENT ITEM ON ISTK STACK :
      680 ISTK(K)=LA2(LA)*2147483648+536870912+ICON+LA4(LA)*1024
         1         +LA5(LA)
          GO TO 520
C         IS THIS END OF INPUT DATA ?
      700 IF(IRTN.EQ.3)GO TO 710
C         BRANCH ON VALUE OF OUTPUT ISTK SIGNAL :
      705 IF(IOUT.NE.1)RETURN
C         RESET ISTK STACK POINTER :
      710 K=K-2
C         OUTPUT COUNT OF WORDS IN ISTK STACK AND OUTPUT ISTK STACK :
      711 WRITE (02) K
          K1=K+1
          WRITE (02) (ISTK(J),J=2,K1)
C         UPDATE NUMBER OF ISTK STACK LOADS :
      715 LSTK=LSTK+1
C         RESET ISTK STACK POINTER TO 2 :
      720 K=2
          RETURN
          END

SUBROUTINE HUF (N,LEN,KODE,ISIG)
C
C
C****  SUBROUTINE ARGUMENTS ARE AS FOLLOWS :
C
C      N    : NUMBER OF ITEMS IN THE FREQUENCY DISTRIBUTION FOR WHICH
C             HUFFMAN CODES ARE TO BE DERIVED.
C      LEN  : ON INPUT, LEN IS AN ARRAY CONTAINING THE ITEMS OF THE
C             FREQUENCY DISTRIBUTION.
C
C             ON OUTPUT, THE LEN ARRAY CONTAINS IN EACH ITEM THE NUMBER
C             OF BITS OF THE HUFFMAN CODE IN THE CORRESPONDING POSITION
C             OF THE KODE ARRAY.
C
C      KODE : ON OUTPUT, IF ISIG=0 OR 2, THE KODE ARRAY CONTAINS THE
C             HUFFMAN CODES CORRESPONDING TO THE INPUT FREQUENCY DISTRIBUTION.
C
C             ON OUTPUT, IF ISIG=1, THE FIRST ELEMENT OF THE KODE ARRAY,
C             KODE(1), CONTAINS THE NUMBER OF BITS TO ENCODE THE CODEBOOK.
C
C      ISIG : INDICATES THE TYPE OF PROCESSING THE SUBROUTINE IS TO DO :
C             IN ALL CASES, THE LENGTHS OF THE HUFFMAN CODES ARE COMPUTED.
C
C             IF ISIG = 0, THE HUFFMAN CODES ARE COMPUTED, AND RETURN IS
C                          THEN MADE TO THE CALLING PROGRAM.
C
C             IS ISIG = 1, THE HUFFMAN CODES ARE NOT COMPUTED, BUT THE
C                          CODEBOOK BITS ARE COMPUTED, BUT THE CODEBOOK IS
C                          NOT ACTUALLY ENCODED AND OUTPUTTED.
C
C             IF ISIG = 2, THE HUFFMAN CODES ARE COMPUTED, AND THE
C                          CODEBOOK IS ENCODED AND OUTPUTTED.
C
          DIMENSION LEN(1), KODE(1)
          DATA I2/000000100000U/,I3/0100000000000/,I4/0100002000000/
C
C
```

```
C**** SORT INPUT INTO KODE ARRAY :
C
      DO 15 J=1,N
      MAX=0
      DO 11 I=1,N
      IF(LEN(I)-MAX)11,11,10
   10 MAX=LEN(I)
      MAXI=I
   11 CONTINUE
      IF(MAX.EQ.0)GO TO 16
      KODE(J)=MAX+MAXI*I2
   15 LEN(MAXI)=0
      NN=N
      GO TO 17
   16 NN=J-1
C
C**** PERFORM SUCCESSIVE SUMMATIONS AND SORTS :
C     IA IS NO. OF SUMS AND SORTS; J IS INDEX TO BOTTOM OF SUMMED PAIR.
C
   17 IA=NN-2
      IF(IA.LE.0) GO TO 121
      DO 25 I=1,IA
      J=NN-I+1
      ISUM=KODE(J)+KODE(J-1)
C
C**** MOVE TOP OF PAIR TO LEN ARRAY; BOTTOM OF PAIR REMAINS INTACT :
C
      LEN(I)=KODE(J-1)
C
C**** SORT ISUM INTO KODE ARRAY :
C
      JK=J-2
      DO 20 K=1,JK
      L=JK-K+1
      IF(MOD(ISUM,I2)-MOD(KODE(L),I2))21,21,20
   20 KODE(L+1)=KODE(L)
      L=0
C
C**** INSERT SUM, SEQUENCE NO., AND INTERMEDIATE SIGNAL INTO ARRAY :
C
   21 KODE(L+1)=MOD(ISUM,I2)+(J-1)*I2+I3
   25 CONTINUE
C
C**** PERFORM SUCCESSIVE SEARCH ON SORT SEQUENCE NOS.,
C     GENERATE SUCCESSIVELY HIGHER CODE LENGTHS,
C     GET ORIGINAL POSITION NOS. FROM LEN ARRAY :
C
      KODE(1)=KODE(1)-MOD(KODE(1),I2)+1
      KODE(2)=KODE(2)-MOD(KODE(2),I2)+1
      IR=I4
      IA=NN-2
C
C**** IR IS SEQUENCE NO. AND INTERMEDIATE SIGNAL OF NEXT ITEM TO BE
C     REPLACED BY 2 ITEMS :
      DO 30 J=3,NN
C
C**** FIND ITEM TO BE REPLACED :
C
      DO 28 I=1,J
      IM=MOD(KODE(I),I2)
      IF((KODE(I)-IM).EQ.IR)GO TO 29
   28 CONTINUE
   29 KODE(I)=LEN(IA)-MOD(LEN(IA),I2)+IM+1
      KODE(J)=KODE(J)-MOD(KODE(J),I2)+IM+1
      LEN(IA)=0
      IA=IA-1
      IR=IR+I2
   30 CONTINUE
C
C**** REPOSITION CODE LENGTH VALUES INTO THEIR INPUT SEQUENCE :
C
      DO 35 I=1,NN
      IPOS=KODE(I)/I2
   35 LEN(IPOS)=MOD(KODE(I),I2)
      IF(ISIG.EQ.1) GO TO 200
```

```
C
C****  DERIVE HUFFMAN CODES FROM CODE LENGTHS :
C
C****  COPY -LEN ARRAY INTO CODE ARRAY AND FIND MAXIMUM LENGTH :
C
       MAX=0
       DO 100 I=1,N
       KODE(I)=-LEN(I)
       IF(LEN(I).LE.MAX)GO TO 100
       MAX=LEN(I)
   100 CONTINUE
C
C****  SEARCH FOR NEXT SMALLEST LENGTH GREATER THAN ZERO :
C
       IPLEN=0
       IPKODE=-1
       DO 120 J=1,N
       ILEN=-MAX-1
       DO 110 I=1,N
       IF(KODE(I).GE.0)GO TO 110
       IF(KODE(I).LE.ILEN)GO TO 110
       ILEN=KODE(I)
       NDX=I
   110 CONTINUE
       IF(ILEN.EQ.(-MAX-1)) RETURN
       ISHIFT=IPLEN-ILEN
       KODE(NDX)=(IPKODE+1)*2**ISHIFT
       IPLEN=ILEN
       IPKODE=KODE(NDX)
   120 CONTINUE
       RETURN
C****  ONLY 1 OR 2 CODES :
C
C
   121 MAXI1=KODE(1)/I2
       MAXI2=KODE(2)/I2
       DO 122 I=1,N
   122 KODE(I)=0
       IF(IA.EQ.0) GO TO 123
C
C****  ONLY 1 CODE :
C
       LEN(MAXI1)=1
       IF(ISIG.GE.1) GO TO 200
       RETURN
C
C****  ONLY 2 CODES :
C
   123 LEN(MAXI1)=1
       LEN(MAXI2)=1
       IF(ISIG.GE.1) GO TO 200
       KODE(MAXI2)=1
       RETURN
C
C****  COMPUTE CODEBOOK BITS, AND OUTPUT CODEBOOK IF CALLED FOR :
C
   200 IBIT=0
       KOUNT=1
       DO 230 I=2,N
       IF(LEN(I).GT.15) GO TO 250
       IF(LEN(I).NE.LEN(I-1)) GO TO 210
       KOUNT=KOUNT+1
       IF(I.EQ.N) GO TO 210
       GO TO 230
   210 IF(ISIG.EQ.2) CALL OUT(4,LEN(I-1))
       IF(KOUNT.GT.15) GO TO 215
       IBIT=IBIT+8
       IF(ISIG.EQ.2) CALL OUT(4,KOUNT)
       GO TO 220
   215 IBIT=IBIT+18
       IF(ISIG.EQ.2) CALL OUT(4,0)
   216 IF(KOUNT.LE.1023) GO TO 220
       IBIT=IBIT+10
       IF(ISIG.EQ.2) CALL OUT(10,1023)
```

```
      KOUNT=KOUNT-1023
      GO TO 216
  220 IF(ISIG.EQ.2) CALL OUT(10,KOUNT)
      KOUNT=1
  225 IF(1.LT.N) GO TO 230
      IF(N.EQ.1) GO TO 235
      IF(LEN(N).NE.LEN(N-1)) IBIT=IBIT+8
      IF(ISIG.EQ.2) CALL OUT(4,LEN(N))
      IF(ISIG.EQ.2) CALL OUT(4,1)
  230 CONTINUE
  235 IF(ISIG.EQ.2) CALL OUT(4,0)
C
C**** SAVE CODEBOOK BITS :
C
      IF(ISIG.EQ.1) KODE(1)=IBIT+4
      RETURN
  250 ISIG=0
      RETURN
      END

SUBROUTINE OPT
C
C
      COMMON /COM1/ IBACK,IN(1024),INC,IPOX,IRTN,ISNOW,ISTK(10000),
     1              ISTKSZ,IWL,IWR,IWT,IWW,IY,LENMAX(2),LSTK,
     3              NFILL(18,2),NHEAD(43,2),NINC(49,2),NPOS(20000,2),
     4              NSNOW(2)
      COMMON /COM2/ ITF2,ITH2,ITIE2,ITP2,
     1              KHUFF(18),KHUFH(43),KHUFI1(8),KHUFI2(50),
     2              KHUFM(20000),KHUFR(1000),KRUN(121),KSIG,
     2              LHUFF(16),LHUFH(43),LHUFI1(8),LHUFI2(50),
     4              LHUFM(20000),LHUFR(1000),LRUN(121)
      DIMENSION     IP(4),ISEC(13),IV(4),MBITIE(4),NBLOB(2),NINCX1(8),
     2              NINCX2(50)
      DATA          IP /4,16,64,256/, ISEC /1,2,5,14,41,122,365,1094,
     1              3281,9842,29525,88574,265721/, IV /1,3*0/,
     2              THUF /1./, TRUN /0./
C
C
C**** IS BACKGROUND LEVEL DETERMINED BY USER ?
C
      IF(IBACK.EQ.0) GO TO 299
      LEV=2
      IF(IBACK.EQ.1) GO TO 300
C
C**** DETERMINE OPTIMAL CODING FOR EACH LEVEL :
C
  299 LEV=1
C
C**** GET BITS FOR HUFFMAN CODES FOR HEADS (IBITH) :
C
  300 DO 301 N=1,43
  301 LHUFH(N)=NHEAD(N,LEV)
  307 CALL HUF(43,LHUFH,KHUFH,1)
  308 IF(NHEAD(41,LEV).EQ.0) GO TO 310
  309 LHUFH(41)=LHUFH(41)+5
  310 IF(NHEAD(42,LEV).EQ.0) GO TO 311
      LHUFH(42)=LHUFH(42)+7
  311 IF(NHEAD(43,LEV).EQ.0) GO TO 939
      LHUFH(43)=LHUFH(43)+10
  939 IBITH=0
  940 DO 941 N=1,43
  941 IBITH=IBITH+NHEAD(N,LEV)*LHUFH(N)
C
C**** GET NUMBER OF BLOB END CODES :
C
      NBLOB(LEV)=0
      DO 9312 N=1,43
 9312 NBLOB(LEV)=NBLOB(LEV)+NHEAD(N,LEV)
C
C**** GET BITS FOR HUFFMAN CODES FOR SECOND EXTENSION OF INCREMENTS
C     AND ENDS (IBITI2,IBITE2) :
C
  312 DO 313 N=1,49
      NINCX2(N)=NINC(N,LEV)
```

```
    313 LHUFI2(N)=NINCX2(N)
    314 LHUFI2(50)=NBLOB(LEV)
    315 CALL HUF(50,LHUFI2,KHUFI2,1)
        IBITI2=0
        DO 9315 N=1,49
   9315 IBITI2=IBITI2+NINCX2(N)*LHUFI2(N)
        IBITE2=NBLOB(LEV)*LHUFI2(50)
C
C**** GET BITS FOR HUFFMAN CODES FOR FIRST EXTENSION OF INCREMENTS
C     AND ENDS (IBITI1,IBITE1) :
C
        DO 9316 N=1,7
   9316 NINCX1(N)=0
        DO 9317 N1=1,7
        DO 9317 N2=1,7
        N3=(N1-1)*7+N2
        NINCX1(N1)=NINCX1(N1)+NINCX2(N3)
   9317 NINCX1(N2)=NINCX1(N2)+NINCX2(N3)
        DO 9318 N=1,7
   9318 LHUFI1(N)=NINCX1(N)
        LHUFI1(8)=NBLOB(LEV)
        CALL HUF(8,LHUFI1,KHUFI1,1)
        IBITI1=0
        DO 9319 N=1,7
   9319 IBITI1=IBITI1+NINCX1(N)*LHUFI1(N)
    950 IBITE1=NBLOB(LEV)*LHUFI1(8)
C
C**** IF THIS IS A SECOND APPROXIMATION TYPE ENCODING, GET BITS FOR
C     HUFFMAN CODES FOR FILLERS :
C
        IBITF=0
    316 IF (IPOX.NE.2) GO TO 4000
    317 DO 318 N=1,18
    318 LHUFF(N)=NFILL(N,LEV)
    324 CALL HUF(18,LHUFF,KHUFF,1)
    325 IF(NFILL(17,LEV).EQ.0) GO TO 327
    326 LHUFF(17)=LHUFF(17)+4
    327 IF(NFILL(18,LEV).EQ.0) GO TO 4000
    328 LHUFF(18)=LHUFF(18)+8
C
C**** DETERMINE IF END CODE PRECEDES INCREMENT CODE IN ELIAS CODING
C     OF INCREMENT,END CODES :
C
   4000 DO 4005 I=1,7
   4005 IF(NBLOB(LEV).GT.NINCX1(I)) GO TO 4015
C
C**** PUT END CODE BEFORE INCREMENTS:
C
        DO 4010 I=1,7
        J=9-I
   4010 NINCX1(J)=NINCX1(J-1)
        NINCX1(1)=NBLOB(LEV)
        KSIG2=1
        GO TO 4020
C
C**** PUT END CODE AFTER INCREMENTS:
C
   4015 NINCX1(8)=NBLOB(LEV)
        KSIG2=0
   4020 DO 4025 I=1,49
   4025 IF(NBLOB(LEV).GT.NINCX2(I)) GO TO 4035
C
C**** PUT END CODE BEFORE INCREMENTS:
C
        DO 4030 I=1,49
        J=51-I
   4030 NINCX2(J)=NINCX2(J-1)
        NINCX2(1)=NBLOB(LEV)
        KSIG1=1
        GO TO 4040
C
C**** PUT END CODE AFTER INCREMENTS:
```

```
C
 4035 NINCX2(50)=NBLOB(LEV)
      KSIG1=0
C
C**** GET ELIAS RUN LENGTH CODE BITS FOR HEADS (LBITH),
C     FILLERS (LBITF), AND INCREMENTS-ENDS FOR FIRST AND SECOND
C     EXTENSIONS (LBITI1,LBITI2) :
C
 4040 LBITH=0
      LBITF=0
      LBITI1=0
      LBITI2=0
      NDX=1
      LBIT=0
      DO 4050 I=1,1500
      IF(I.LT.ISEC(NDX)) GO TO 4045
      NDX=NDX+1
      LBIT=LBIT+2
 4045 IF(I.LE.1024) LBITH=LBITH+NHEAD(I,LEV)*LBIT
      LBITF=LBITF+NFILL(I,LEV)*LBIT
      IF(I.LE.8) LBITI1=LBITI1+NINCX1(I)*LBIT
 4050 IF(I.LE.50) LBITI2=LBITI2+NINCX2(I)*LBIT
C
C**** GET MINIMUM BITS FOR HEAD CODES (MBITH2) :
C
 5010 IF((IBITH+172).GT.LBITH) GO TO 5011
      MBITH2=IBITH+172
      TH2=THUF
      GO TO 5015
 5011 MBITH2=LBITH
      TH2=TRUN
C
C**** IF THIS IS A SECOND APPROXIMATION TYPE ENCODING, GET MINIMUM BITS
C     FOR FILLER CODES (MBITF2) :
C
 5015 IF(IPOX.NE.2) GO TO 5017
      IF((IBITF+72).GT.LBITF) GO TO 5016
      MBITF2=IBITF+72
      TF2=THUF
      GO TO 5020
 5016 MBITF2=LBITF
      TF2=TRUN
      GO TO 5020
 5017 MBITF2=0
C
C**** GET MINIMUM BITS FOR INCREMENT-END CODES (MBITI2) :
C
 5020 MBITIE(1)=IBITI1+IBITE1+32
      MBITIE(2)=IBITI2+IBITE2+200
      MBITIE(3)=LBITI1
      MBITIE(4)=LBITI2
      MIN=MBITIE(1)
      NDX=1
      DO 5021 I=2,4
      IF(MBITIE(I).GE.MIN) GO TO 5021
      MIN=MBITIE(I)
      NDX=I
 5021 CONTINUE
      TIE2=NDX-1
      MBITI2=MBITIE(NDX)
      KSIG=KSIG1
      IF(NDX.EQ.4) KSIG=KSIG2
C
C**** GET BITS FOR ORIGINAL POSITIONS USING ELIAS' CODE (IRUN1),
C     AND BITS FOR CODE AND CODEBOOK (JBIT1) USING HUFFMAN MODULO CODE
C     WITH BASE OF 1 :
C
 1000 JBAS=1
      ISIG=1
      IRTN=1
C
C**** GET BITS GIVEN BASE :
C
```

```
C****  FIND LENGTH OF MULTIPLE LIST AND FORM MULTIPLE LIST IN LHUFM :
 2000  IF(JBAS.NE.1) GO TO 2004
       MULLEN=LENMAX(LEV)
       DO 2002 I=1,MULLEN
 2002  LHUFM(I)=NPOS(I,LEV)
       GO TO 2009
 2004  MULLEN=LENMAX(LEV)/JBAS+1
 2005  DO 2006 I=1,MULLEN
 2006  LHUFM(I)=0
       L=1
       J2=JBAS-1
       DO 2008 I=1,MULLEN
       DO 2007 J=1,J2
       LHUFM(I)=LHUFM(I)+NPOS(L,LEV)
       IF(L.EQ.LENMAX(LEV)) GO TO 2009
 2007  L=L+1
 2008  J2=JBAS
C
C****  FIND HUFFMAN CODE LENGTHS (LHUFM), AND CODEBOOK BITS (JBITMD)
C      FOR MULTIPLES :
C
 2009  CALL HUF(MULLEN,LHUFM,KHUFM,ISIG)
       IF(ISIG.EQ.0) GO TO 2050
       IF(IRTN.EQ.3) GO TO 2014
       JBITMD=KHUFM(1)
C
C****  REFORM MULTIPLE LIST IN KHUFM :
C
       IF(JBAS.NE.1) GO TO 92010
       DO 92009 I=1,MULLEN
92009  KHUFM(I)=NPOS(I,LEV)
       GO TO 2012
92010  DO 92011 I=1,MULLEN
92011  KHUFM(I)=0
       L=1
       J2=JBAS-1
       DO 2011 I=1,MULLEN
       DO 2010 J=1,J2
       KHUFM(I)=KHUFM(I)+NPOS(L,LEV)
       IF(L.EQ.LENMAX(LEV)) GO TO 2012
 2010  L=L+1
 2011  J2=JBAS
C
C****  COMPUTE MULTIPLE CODE BITS USING ELIAS CODE (IRUNM), AND USING
C      HUFFMAN CODE (JBITMC) :
C
 2012  JBITMC=0
       IRUNM=0
       NDX=1
       LRBIT=0
       DO 2013 I=1,MULLEN
       IF(I.LT.ISEC(NDX)) GO TO 92014
       NDX=NDX+1
       LRBIT=LRBIT+2
92014  IRUNM=IRUNM+KHUFM(I)*LRBIT
 2013  JBITMC=JBITMC+LHUFM(I)*KHUFM(I)
C
C****  FORM REMAINDER LIST IN LHUFR :
C
 2014  IF(JBAS.EQ.1) GO TO 2019
 2015  DO 2016 I=1,JBAS
 2016  LHUFR(I)=0
       L=1
       I1=2
 2017  DO 2018 I=I1,JBAS
       LHUFR(I)=LHUFR(I)+NPOS(L,LEV)
       IF(L.EQ.LENMAX(LEV)) GO TO 2019
 2018  L=L+1
       I1=1
       GO TO 2017
C
C****  FIND HUFFMAN CODE LENGTHS (LHUFR), AND CODEBOOK BITS (JBITRD)
C      FOR REMAINDERS :
C
 2019  CALL HUF(JBAS,LHUFR,KHUFR,ISIG)
```

```
      IF(ISIG.EQ.0) GO TO 2050
      IF(IRTN.EQ.3) GO TO 355
      JBITRD=KHUFR(1)
C
C**** REFORM REMAINDER LIST IN KHUFR :
C
C
      IF(JBAS.EQ.1) GO TO 2022
      DO 92019 I=1,JBAS
92019 KHUFR(I)=0
      L=1
      I1=2
 2020 DO 2021 I=I1,JBAS
      KHUFR(I)=KHUFR(I)+NPOS(L,LEV)
      IF(L.EQ.LENMAX(LEV)) GO TO 2022
 2021 L=L+1
      I1=1
      GO TO 2020
C
C**** COMPUTE REMAINDER CODE BITS USING HUFFMAN CODE (JBITRC) :
C
 2022 JBITRC=0
      NDX=1
      LRBIT=0
      DO 2023 I=1,JBAS
      IF(I.LT.ISEC(NDX)) GO TO 2023
      NDX=NDX+1
      LRBIT=LRBIT+2
 2023 JBITRC=JBITRC+LHUFR(I)*KHUFR(I)
C
C**** COMPUTE TOTAL MULTIPLE AND REMAINDER CODE AND CODEBOOK BITS (JBIT) :
C
      JBIT=JBITMC+JBITRC+JBITMD+JBITRD+8
      IF(IRTN.EQ.2) GO TO 5075
C
C**** SAVE BITS FOR ORIGINAL POSITIONS USING ELIAS CODE, AND USING
C     HUFFMAN MODULO CODE WITH BASE OF 1 :
C
      IRUN1=IRUNM
      JBIT1=JBIT
C
C**** IF A HUFFMAN CODE IS GREATER THAN 15, PRINT ERROR MESSAGE
C     AND ABORT PROGRAM :
C
 2050 WRITE (06,9969)
 9969 FORMAT (1H0,18HHUFFMAN CODE.GT.15)
      CALL EXIT
C
C**** GET ALGORITHMIC APPROXIMATION TO BASE GIVING MINIMUM BITS FOR
C     POSITIONS USING HUFFMAN MODULO CODING :
C
 5040 IF(JBITMD.EQ.0) GO TO 5041
      JBAS=(-1.+SQRT(1.+.8*FLOAT(JBITMD)))*.5+.5
      GO TO 5045
 5041 WRITE(06,9968)
 9968 FORMAT(1H0,19HPOSITION CODEBOOK=0)
      CALL EXIT
C
C**** GET BITS FOR POSITION CODES AND POSITION CODEBOOKS USING
C     HUFFMAN MODULO CODE WITH ALGORITHMIC APPROXIMATION TO BASE (JBIT) :
C
 5045 IRTN=2
      GO TO 2000
C
C**** GET MINIMUM BITS FOR POSITION CODES AND POSITION CODEBOOKS (MBITP2) :
C
 5075 IF(JBIT1.GT.JBIT) GO TO 5080
      IF(JBIT1.GT.IRUN1) GO TO 5085
      MBITP2=JBIT1
      TP2=THUF
      GO TO 5200
 5080 IF(JBIT.GT.IRUN1) GO TO 5085
      MBITP2=JBIT
      TP2=JBAS
      GO TO 5200
```

```
      5085 MBITF2=IRUN1
           TP2=TRUN
           GO TO 5200
      C
      C**** IF BACKGROUND LEVEL IS TO BE DETERMINED BY PROGRAM, DETERMINE
      C     MINIMUM BITS FOR TOTAL CODES AND TOTAL CODEBOOKS FOR THIS
      C     LEVEL (MBIT) :
      C
      5200 IF(IBACK.GT.0) GO TO 5350
      5205 MBIT=MBITP2+MBITH2+MBITI2+MBITF2
      C
      C**** IF LEVEL IS ONE, SAVE MINIMUM BITS AND SIGNALS :
      C
           IF(LEV.EQ.2) GO TO 5300
           MBIT1=MBIT
           TTH2=TH2
           TTF2=TF2
           TTIE2=TIE2
           KKSIG=KSIG
           TTP2=TP2
           LEV=2
           GO TO 300
      C
      C**** DETERMINE WHICH LEVEL REQUIRES SMALLER NUMBER OF BITS :
      C
      5300 IBACK=0
           IF(MBIT.LT.MBIT1) GO TO 5400
           IBACK=1
           TH2=TTH2
           TF2=TTF2
           TIE2=TTIE2
           KSIG=KKSIG
           TP2=TTP2
           GO TO 5400
      5350 IBACK=IBACK-1
      C
      C**** OUTPUT SIGNAL BITS :
      C
      5400 CALL OUT(1,IBACK)
           CALL OUT(2,IPOX)
           CALL OUT(3,ISNOW)
           CALL OUT(16,NSNOW)
           CALL OUT (16,NSNOW)
           ITH2=TH2
           CALL OUT(1,ITH2)
           ITIE2=TIE2
           CALL OUT(2,ITIE2)
           IF(ITIE2.GE.2) CALL OUT(1,KSIG)
           ITF2=TF2
           CALL OUT(1,ITF2)
           ITP2=TP2
           IF(ITP2.GT.0) GO TO 5405
           CALL OUT(1,0)
           GO TO 5500
      5405 CALL OUT(1,1)
           CALL OUT(10,ITP2)
      C
      C**** GENERATE AND OUTPUT HUFFMAN CODEBOOKS WHERE REQUIRED :
      C
      5500 IMAGE=1
           IF(IBACK.EQ.1) IMAGE=2
      C
      C**** GENERATE AND OUTPUT HEAD CODEBOOK :
      C
      5510 IF(ITH2.EQ.0) GO TO 5520
           DO 5511 N=1,43
      5511 LHUFH(N)=NHEAD(N,IMAGE)
           CALL HUF(43,LHUFH,KHUFH,0)
           IF(NHEAD(41,IMAGE).EQ.0) GO TO 5512
           LHUFH(41)=LHUFH(41)+5
           KHUFH(41)=KHUFH(41)*32
      5512 IF(NHEAD(42,IMAGE).EQ.0) GO TO 5513
           LHUFH(42)=LHUFH(42)+7
           KHUFH(42)=KHUFH(42)*128
```

```
      5513 IF(NHEAD(43,IMAGE).EQ.0) GO TO 5514
           LHUFH(43)=LHUFH(43)+10
           KHUFH(43)=KHUFH(43)*1024
      5514 DO 5515 N=1,43
      5515 CALL OUT(4,KHUFH(N))
C
C**** GENERATE AND OUTPUT INCREMENT-END CODEBOOK :
C
      5520 IF(ITIE2.GE.2) GO TO 5530
           DO 5521 N=1,49
      5521 NINCX2(N)=NINC(N,IMAGE)
           IF(ITIE2.EQ.1) GO TO 5525
C
C**** GENERATE AND OUTPUT INCREMENT-END, SECOND EXTENSION CODEBOOK :
C
           DO 5522 N=1,49
      5522 LHUFI2(N)=NINCX2(N)
           LHUFI2(50)=NBLOB(IMAGE)
           CALL HUF(50,LHUFI2,KHUFI2,0)
           DO 5523 N=1,50
      5523 CALL OUT(4,KHUFI2(N))
           GO TO 5530
C
C**** GENERATE AND OUTPUT INCREMENT-END, FIRST EXTENSION CODEBOOK :
C
      5525 DO 5526 N=1,7
      5526 LHUFI1(N)=0
           DO 5527 N1=1,7
           DO 5527 N2=1,7
           N3=(N1-1)*7+N2
           LHUFI1(N1)=LHUFI1(N1)+NINCX2(N3)
      5527 LHUFI1(N2)=LHUFI1(N2)+NINCX2(N3)
           LHUFI1(8)=NBLOB(IMAGE)
           CALL HUF(8,LHUFI1,KHUFI1,0)
           DO 5528 N=1,8
      5528 CALL OUT(4,KHUFI1(N))
C
C**** GENERATE AND OUTPUT FILLER CODEBOOK :
C
      5530 IF(ITF2.EQ.0) GO TO 5550
           DO 5531 N=1,18
      5531 LHUFF(N)=NFILL(N,IMAGE)
           CALL HUF(18,LHUFF,KHUFF,0)
           IF(NFILL(17,IMAGE).EQ.0) GO TO 5532
           LHUFF(17)=LHUFF(17)+4
           KHUFF(17)=KHUFF(17)*16
      5532 IF(NFILL(18,IMAGE).EQ.0) GO TO 5533
           LHUFF(18)=LHUFF(18)+8
           KHUFF(18)=KHUFF(18)*256
      5533 DO 5534 N=1,18
      5534 CALL OUT(4,KHUFF(N))
C
C**** GENERATE AND OUTPUT POSITION CODEBOOK :
C
      5550 IF(ITP2.EQ.0) GO TO 355
           JBAS=TP2
           ISIG=2
           IRTN=3
           GO TO 2000
C
C**** GENERATE ELIAS CODE AND CODE LENGTH TABLE FOR FIRST 121 ENTRIES :
C
       355 LRUN(1)=2
           KRUN(1)=0
           K=2
C
C**** UPDATE FIRST DIGIT :
C
       356 KRUN(K)=KRUN(K-1)+IP(1)
       357 LRUN(K)=4
           IF(IV(2).NE.0)LRUN(K)=6
           IF(IV(3).NE.0)LRUN(K)=8
           IF(IV(4).NE.0)LRUN(K)=10
           K=K+1
```

```
      IF(IV(1).EQ.3)GO TO 358
      IV(1)=IV(1)+1
      GO TO 356
C
C     UPDATE SUCCESSIVE DIGITS :
C
  358 IF(K.EQ.122) RETURN
      IV(1)=1
      KRUN(K)=KRUN(K-1)+IP(1)+IP(1)
      J=2
  359 IF(IV(J).NE.3)GO TO 360
      KRUN(K)=KRUN(K)+IP(J)
      IV(J)=1
      J=J+1
      GO TO 359
  360 IV(J)=IV(J)+1
      GO TO 357
      END
      SUBROUTINE CODE
C
C
      COMMON /COM1/ IBACK,IN(1024),INC,IPOX,IRTN,ISNOW,ISTK(10000),
     1              ISTKSZ,IWL,IWR,IWT,IWW,IY,LENMAX(2),LSTK,
     3              NFILL(18,2),NHEAD(43,2),NINC(49,2),NPOS(20000,2),
     4              NSNOW(2)
      COMMON /COM2/ ITF2,ITH2,ITIE2,ITP2,
     1              KHUFF(18),KHUFH(43),KHUFI1(8),KHUFI2(50),
     2              KHUFM(20000),KHUFR(1000),KRUN(121),KSIG,
     3              LHUFF(18),LHUFH(43),LHUFI1(8),LHUFI2(50),
     4              LHUFM(20000),LHUFR(1000),LRUN(121)
      DIMENSION     ISEC(13)
      DATA          IKODE /0252525252524/,  ISEC /1,2,5,14,41,122,365,
     1              1094,3281,9842,29525,88574,265721/,
     2              MASK4 /0777777777760/,  MASK5 /0777777777740/,
     3              MASK7 /0777777777600/,  MASK8 /0777777777400/,
     4              MASK10 /0777777776000/
C
C
C**** INITIALIZE :
C
  365 NPE=-IWW
      IPGLOB=0
C
C**** READ NEXT ISTK SEGMENT, TEST FOR END :
C
  400 READ (02) NSTK
  405 IF(NSTK.LT.0) GO TO 900
      READ (02) (ISTK(J),J=2,NSTK)
  415 K=2
C
C**** IDENTIFY NEXT ISTK ITEM :
C
  420 IF(ISTK(K))425,430,440
C
C**** LINES ITEM :
C
  425 NPE=NPE+IWW
C
C**** EMPTY ITEM :
C
  430 K=K+1
  435 IF(K.GT.NSTK+1) GO TO 400
      GO TO 420
C
C**** HEAD ITEM :
C
  440 IGL=ISTK(K)/2147483648
  445 IF(IGL.EQ.IBACK)GO TO 430
C
C**** ENCODE POSITION OF BLOB :
C
  450 IXL=MOD(ISTK(K)/1024,1024)
  455 IGLOB=NPE+IXL-IWL+2
```

```
      460 LEN=IGLOB-IPGLOB
          IF(ITP2.GT.0) GO TO 560
C
C         ENCODE POSITION WITH ELIAS CODE :
C
          IRTN=1
C
C****  FOLLOWING IS GENERAL PROGRAM TO OUTPUT ELIAS CODE FOR ANY OF THE
C      BLOB PARAMETERS :
C
      465 IF(LEN.GT.121) GO TO 500
      470 CALL OUT(LRUN(LEN),KRUN(LEN))
          GO TO 550
      500 DO 501 N=7,13
          IF(LEN.LT.ISEC(N)) GO TO 505
      501 CONTINUE
      505 IPOS=LEN-ISEC(N-1)
      510 KODE=IKODE
      515 JBIT=4
      520 KODE=KODE+MOD(IPOS,3)*JBIT
      525 JBIT=JBIT*4
      530 IPOS=IPOS/3
      535 IF(IPOS.NE.0)GO TO 520
      540 LNG=N+N-2
          CALL OUT(LNG,KODE)
      550 GO TO (600,685,718,722,735),IRTN
C
C****  ENCODE POSITION WITH HUFFMAN CODE :
C
      560 IF(ITP2.GT.1) GO TO 565
C
C****  HUFFMAN MODULO BASE IS 1; ENCODE POSITION WITH ONE HUFFMAN CODE :
C
          CALL OUT(LHUFM(LEN),KHUFM(LEN))
          GO TO 600
C
C****  HUFFMAN MODULO BASE IS GREATER THAN 1; ENCODE POSITION WITH TWO
C      HUFFMAN CODES, ONE EACH FOR THE MULTIPLE AND REMAINDER :
C
      565 LMUL=LEN/ITP2
          LREM=LEN-LMUL*ITP2
          CALL OUT(LHUFM(LMUL+1),KHUFM(LMUL+1))
          CALL OUT(LHUFR(LREM+1),KHUFR(LREM+1))
C
C****  ENCODE HEAD :
C
      600 IXR=MOD(ISTK(K),1024)
      615 LEN=IXR-IXL+1
          IF(ITH2.GT.0) GO TO 620
C
C****  ENCODE HEAD WITH ELIAS CODE :
C
          IRTN=2
          GO TO 465
C
C****  ENCODE HEAD WITH HUFFMAN CODE :
C
      620 IF(LEN.GT.40) GO TO 630
          GO TO 670
      630 IF(LEN.GT.72) GO TO 640
          KHUFH(41)=AND(KHUFH(41),MASK5)+LEN-41
          LEN=41
          GO TO 670
      640 IF(LEN.GT.200) GO TO 650
          KHUFH(42)=AND(KHUFH(42),MASK7)+LEN-73
          LEN=42
          GO TO 670
      650 KHUFH(43)=AND(KHUFH(43),MASK10)+LEN-201
          LEN=43
      670 CALL OUT(LHUFH(LEN),KHUFH(LEN))
      685 IPGLOB=NPE+IXR-IWL+2
C
C****  ENCODE INCREMENTS AND END CODE :
```

```
C
   700 ICON=MOD(ISTK(K)/1048576,512)
   705 IF(ICON.EQ.0)GO TO 825
   710 ICON=ICON+K
       JXL=IXL
       JXR=IXR
   711 IFILL=1
   715 INCODE=MOD(ISTK(ICON)/536870912,2)
   716 IF(INCODE.EQ.1) GO TO 720
C
C**** ITEM IS A FILLER :
C
   717 IFILL=IFILL+1
       GO TO 765
C
C**** ITEM IS AN INCREMENT :
C
       IF(ITIE2.LT.2) GO TO 720
C
C**** ENCODE INCREMENT WITH ELIAS CODE :
C
       IF(ITIE2.EQ.3) GO TO 719
C
C**** USE FIRST EXTENSION OF INCREMENT-END CODES;
C     ENCODE INCREMENT WITH TWO ELIAS CODES;
C
C     ONE EACH FOR LEFT AND RIGHT SIDES;
C     ADD KSIG, WHICH IS 0 IF THE END CODE FOLLOWS THE INCREMENT CODES,
C     AND 1 IF THE END CODE PRECEDES THE INCREMENT CODES :
C
       LEN=(INCODE-1)/7+1+KSIG
       IRTN=3
       GO TO 465
   718 LEN=MOD(INCODE,7)
       IF(LEN.EQ.0) LEN=7
       LEN=LEN+KSIG
       IRTN=4
       GO TO 465
C
C**** USE SECOND EXTENSION OF INCREMENT-END CODES;
C     ENCODE INCREMENT WITH ONE ELIAS CODE;
C     ADD KSIG, WHICH IS 0 IF THE END CODE FOLLOWS THE INCREMENT CODES,
C     AND 1 IF THE END CODE PRECEDES THE INCREMENT CODES :
C
   719 LEN=INCODE+KSIG
       IRTN=4
       GO TO 465
C
C**** ENCODE INCREMENT WITH HUFFMAN CODE :
C
   720 IF(ITIE2.EQ.1) GO TO 721
C
C**** USE FIRST EXTENSION OF INCREMENT-END CODES :
C     ENCODE INCREMENT WITH TWO HUFFMAN CODES, ONE EACH FOR LEFT AND
C     RIGHT SIDES :
C
       ILEF=(INCODE-1)/7+1
       CALL OUT(LHUFI1(ILEF),KHUFI1(ILEF))
       IRIG=MOD(INCODE,7)
       IF(IRIG.EQ.0) IRIG=7
       CALL OUT(LHUFI1(IRIG),KHUFI1(IRIG))
       GO TO 722
C
C**** USE SECOND EXTENSION OF INCREMENT-END CODES;
C     ENCODE INCREMENT WITH ONE HUFFMAN CODE :
C
   721 CALL OUT(LHUFI2(INCODE),KHUFI2(INCODE))
C
C**** ENCODE FILLER, IF THIS IS SECOND APPROXIMATION TYPE ENCODING :
C
   722 IF(IFOX.NE.2) GO TO 765
       IF(ITF2.GT.0) GO TO 723
C
C**** ENCODE FILLER WITH ELIAS CODE :
```

```
C
        LEN=IFILL
        IRTN=5
        GO TO 465
C
C**** ENCODE FILLER WITH HUFFMAN CODE :
C
  723 IF(IFILL.GT.16) GO TO 725
        GO TO 733
  725 IF(IFILL.GT.32) GO TO 730
  727 KHUFF(17)=AND(KHUFF(17),MASK4)+IFILL-17
        IFILL=17
        GO TO 733
  730 KHUFF(18)=AND(KHUFF(18),MASK8)+IFILL-33
        IFILL=18
  733 CALL OUT(LHUFF(IFILL),KHUFF(IFILL))
  735 IFILL=1
C
C**** IF THIS IS NOT THE END OF THE BLOB, SET UP TO PROCESS NEXT RUN IN BLOB
C
  765 IPCON=ICON
  770 ICON=MOD(ISTK(IPCON)/1048576,512)
  775 IF(ICON.EQ.0)GO TO 800
  780 ICON=ICON+IPCON
  785 ISTK(IPCON)=0
        GO TO 715
C
C**** ENCODE END OF BLOB :
C
  800 IXL=MOD(ISTK(IPCON)/1024,1024)
  805 IXR=MOD(ISTK(IPCON),1024)
  810 LEN=IXR-IXL+1
  820 ISTK(IPCON)=0
  825 IF(ITIE2.LT.2) GO TO 845
C
C**** ENCODE END WITH ELIAS CODE :
C
  830 IF(ITIE2.EQ.3) GO TO 840
C
C**** USE FIRST EXTENSION OF INCREMENT-END ELIAS CODES :
C
  835 IF(KSIG.EQ.0) CALL OUT(LRUN(8),KRUN(8))
        IF(KSIG.EQ.1) CALL OUT(LRUN(1),KRUN(1))
        GO TO 900
C
C**** USE SECOND EXTENSION OF INCREMENT-END ELIAS CODES :
C
  840 IF(KSIG.EQ.0) CALL OUT(LRUN(50),KRUN(50))
        IF(KSIG.EQ.1) CALL OUT(LRUN(1),KRUN(1))
        GO TO 900
C
C**** ENCODE END WITH HUFFMAN CODE :
C
  845 IF(ITIE2.EQ.1) GO TO 855
C
C**** USE FIRST EXTENSION OF INCREMENT-END HUFFMAN CODES :
C
  850 CALL OUT(LHUFI1(8),KHUFI1(8))
        GO TO 900
C
C**** USE SECOND EXTENSION OF INCREMENT-END HUFFMAN CODES :
C
  855 CALL OUT(LHUFI2(50),KHUFI2(50))
C
C**** FLUSH OUTPUT BUFFER AND RETURN TO MAIN CONTROL PROGRAM :
C
  900 CALL OUT(37,0)
        RETURN
        END
        SUBROUTINE OUT(N,JWORD)
C
C
C**** OUT MOVES N RIGHTMOST BITS OF JWORD TO BUF;
C     EACH TIME BUF IS FILLED IT IS OUTPUTTED AND CLEARED;
```

```
C     N=37 CAUSES AN UNFILLED BUF TO BE OUTPUTTED.
C
      INTEGER BUF
      DATA I/1/,BUF/0/
C
      IF(N.NE.37)GOTO 2
      WRITE(2)BUF
      END FILE 2
      RETURN
    2 N2=N
      NLEFT=36-I+1
      JWORD2=JWORD
      IF(N.LE.NLEFT)GOTO 5
      N2=NLEFT
      K=36-N+1
      JWORD2=JGETB(JWORD,K,NLEFT)
    5 CALL JPUTB(BUF,I,N2,JWORD2)
      I=I+N2
      IF(I.NE.37)RETURN
      WRITE(2)BUF
      BUF=0
      I=1
      IF(N.EQ.N2)RETURN
      N2=N-NLEFT
      CALL JPUTB(BUF,I,N2,JWORD)
      I=I+N2
      RETURN
      END
```

```
$       GMAP                                                        BITPK
        TTL     BIT MANIPULATION PACKAGE - JGETB , JPUTB
        LBL     BITPK000
*
*
*
*               JGETB(FROM,I,N)         FORTRAN-CALLABLE FUNCTION
*
*       THIS FUNCTION RETURNS, RIGHT-ADJUSTED IN THE QR, N BITS
*       STARTING WITH THE I-TH BIT OF STRING FROM.
*
*
*               JPUTB(TO,I,N,FROM)      FORTRAN-CALLABLE SUBROUTINE
*
*       THIS SUBROUTINE REPLACES BITS I THRU I+N-1 OF STRING TO
*       WITH THE N RIGHT-MOST BITS OF WORD FROM.
*
*
*       I AND N ARE FULL-WORD INTEGERS, WHERE
*               I .GE. 1  AND
*               1 .LE. N .LE. 36
*
*       ON ANY ERROR, ZERO IS RETURNED FOR JGETB, AND THE STRING TO
*       IS UNCHANGED FOR JPUTB.
*
        SYMDEF  JGETB,JPUTB
*
*
JGETB   TSX0    J1
*
        LCX0    NBITS           X0 = -N
        XED     PLD             I-TH BIT IN BIT 0
        LRL     72,0            RT-JUSTIFY IN QR WITH LEADING ZEROS
        TRA     0,1             RETURN
*
FTEMP   OCT     0               PUT HERE TO PAD OUT LATER EVEN WORD-PAIR
*
JPUTB   TSX0    J1
*
        LCX0    NBITS           X0 = -N
        LDQ     5,1*            GET FROM
        QLS     36,0            LEFT-SHIFT 36-N BITS AND FILL WITH ZEROS
        QRL     36,0            RIGHT-ADJUST WITH LEADING ZEROS
        STQ     FTEMP
PLD     ELDQ    **              ADDRESS OF 2ND WORD IF NEEDED, 1ST (NOP) IF NOT
        LLR     FBIT,I          I-TH BIT IN BIT 0 ("A" FLAG IS OK)
```

```
   NBITS  LLS    **          BRING IN N BITS OF ZEROS
          ORG    FTEMP       INSERT NEW N BITS
          SBX0   FBIT        -N - I + 1
          LLR    72,0        ROTATE 72-N-I+1
          STQ    PLD,I       ADDRESS OF 2ND WORD IF NEEDED, 1ST (NOP) IF NOT
          STA    LD1,I       NEW TO
          TRA    0,1         RETURN
   *
   J1     STX1   .E.L..      COMMON PART OF PUT AND GET--SAVE ERROR LINKAGE
          LDQ    3,1*        GET I
          SBQ    1,DL
          TMI    ERR
          DIV    36,DL

EAA    0,AL        AU = I-1 (0.LE.I-1.LE.35)
          STCA   FBIT,70     SAVE I-1
          EAA    2,1*            GET STRING WORD ADDRESS                    SSS
          STCA   *+1,70          INIT NEXT INSTR. WITH IT.                  SSS
          EAQ    **,QL           ADD STRING WORD ADDRESS                    SSS
          STCQ   LD1,70      SET UP ADDRESS OF 1ST WORD
          LDA    4,1*        GET #BITS
          TMI    ERR         N = 0 WILL BE HANDLED PROPERLY
          EAA    0,AL        AU = N
          STCA   NBITS,70    SAVE N
          SBA    37,DU       CHECK N = 0 THRU 36

TPL    ERR
   FBIT   ADA    **,DU       SEE WHETHER ONE OR TWO WORDS NEEDED FOR SHIFTS
          TMI    *+2         NEED ONLY 1 WORD (N-37 + I-1 .LT. 0)
          ADLQ   1,DU        PREPARE SETUP FOR USE OF 2 SUCCESSIVE WORDS
          STCQ   PLD,70      SET UP ADDRESS OF 1ST OR 2ND WORD
   LD1    LDA    **          GET FROM (JGETB) OR TO (JPUTB)--1ST WORD
          TRA    0,0         RETURN TO PUT OR GET
   *
   ERR    LDQ    0,DL        ERROR IN CALLING SEQUENCE
          TRA    0,1         RETURN
          END
```

```
C     PROGRAM TO GENERATE APPROXIMATE IMAGES :
C
C
      DIMENSION ISTK(10000),LNA(1024),LNB(1024)
      EQUIVALENCE (ISTK(1),K)
      DATA IKON1 /0010000000000/, IKON2 /0004000000000/,
     1     IKON3 /0777774000000/, IKON4 /0014000000000/
C
C
C**** INITIALIZE :
C
C     SET THE LEVEL OF THE IMAGE TO THE NON-BACKGROUND LEVEL :
 6000 IMAGE=0
      IF(IBACK.EQ.0) IMAGE=1
C     SET THE MAXIMUM LENGTH OF A SUBHEAD OR A SUBTAIL LESS 1 :
 6003 LENSNO=ISNOW+INC+INC-1
C     READ THE RUN TIME PARAMETERS :
 6004 READ 9999, NSAM,INC,IPOX,ISNOW,INL,INR,NSNOW,IBACK,INTERP
 9999 FORMAT(9I5)
C
C**** READ THE NEXT STACK SEGMENT :
C
C     READ THE NUMBER OF WORDS IN THE NEXT STACK SEGMENT :
 6011 READ (01) NSTK
C     HAVE ALL THE STACK SEGMENTS BEEN PROCESSED ?
 6012 IF(NSTK.LT.0) GO TO 6800
C     SET THE SIGNAL TO INDICATE THAT THE LAST LINE IS NOT YET OUTPUTTED :
 6013 LAST=0
C     READ IN THE NEXT STACK SEGMENT STARTING AT ISTK(2) :
      NSTK1=NSTK+1
 6015 READ (01) (ISTK(J),J=2,NSTK1)
C     ARE FILLERS TO BE GENERATED ?
 6020 IF(IPOX.NE.2) GO TO 6200
C
C**** GENERATE THE FILLER STACK ENTRIES :
C
```

```
C     RESET THE STACK POINTER :
6021  K=3
C
C     ADVANCE TO THE NEXT NON-BACKGROUND BLOB IN THE STACK :
C
C     IS THE NEXT STACK ENTRY A LINES ITEM ?
6022  IF(ISTK(K).LT.0) GO TO 6035
C     IS THE NEXT STACK ENTRY A BLOB HEAD :
6023  ITYP=AND(ISTK(K),IKON4)
      IF(ITYP.NE.IKON1) GO TO 6035
C     GET THE GRAY LEVEL OF THE HEAD :
6024  IGL=ISTK(K)/2147483648
C     IS THE GRAY LEVEL OF THE HEAD EQUAL TO THE BACKGROUND LEVEL ?
6025  IF(IGL.NE.IBACK) GO TO 6045
C     UPDATE THE STACK POINTER :
6035  K=K+1
C     IS THIS THE END OF THE CURRENT STACK SEGMENT ?
6040  IF(K.GT.NSTK+1) GO TO 6200
      GO TO 6022
C     SAVE THE STACK POINTER TO THE CURRENT ITEM :
6045  IPCON=K
C     SAVE THE SPINE 1 POINTER :
6050  K1=IPCON

C     RESET THE FILLER COUNT TO 0 :
6055  KFILL=0
C
C     SEARCH FOR THE NEXT SPINE IN THE CURRENT BLOB :
C
C     GET THE POINTER TO THE STACK POSITION OF THE NEXT RUN IN THE BLOB,
C     RELATIVE TO THE CURRENT ITEM :
6060  ICON=MOD(ISTK(IPCON)/1048576,512)
C     IS THERE A SUCCEEDING RUN ?
6065  IF(ICON.EQ.0) GO TO 6035
C     CHANGE THE POINTER TO THE STACK POSITION OF THE SUCCEEDING RUN
C     FROM RELATIVE TO ABSOLUTE :
6070  IPCON=ICON+IPCON
C     IS THE SUCCEEDING RUN A SPINE ?
6075  IF(AND(ISTK(IPCON),IKON2).NE.0) GO TO 6090
C     UPDATE THE FILLER COUNT :
6080  KFILL=KFILL+1
      GO TO 6060
C     IS THE FILLER COUNT EQUAL TO 0 ?
6090  IF(KFILL.EQ.0) GO TO 6055
C     GET THE LEFT AND RIGHT ENDS OF SPINE 1 :
6100  IXL1=MOD(ISTK(K1)/1024,1024)
      IXR1=MOD(ISTK(K1),1024)
C     GET THE LEFT AND RIGHT ENDS OF SPINE 2 :
6105  IXL2=MOD(ISTK(IPCON)/1024,1024)
      IXR2=MOD(ISTK(IPCON),1024)
C     IS NON-LINEAR INTERPOLATION TO BE USED ?
      IF(INTERP.EQ.1) GO TO 16110
C
C**** GENERATE THE FILLER STACK ENTRIES USING LINEAR INTERPOLATION :
C
C     GET THE SLOPES EXTENDING ON THE LEFT SIDE AND ON THE RIGHT SIDE
C     FROM SPINE 1 TO SPINE 2 :
6110  FILL=KFILL+1
      TANL=FLOAT(IXL2-IXL1)/FILL
      TANR=FLOAT(IXR2-IXR1)/FILL
C     INITIALIZE THE FILLER LINE NUMBER :
      FILN=1.
C     SET THE ROUNDING FACTORS :
      RNDL=.5
      IF(TANL.LT.0.) RNDL=-.5
      RNDR=.5
      IF(TANR.LT.0.) RNDR=-.5
C     GET THE POINTER TO THE STACK POSITION OF THE NEXT FILLER RUN :
6140  K1=K1+MOD(ISTK(K1)/1048576,512)
C     IS THIS THE END OF THE FILLER RUNS ?
6145  IF(K1.NE.IPCON) GO TO 6150
      GO TO 6055
C     GET THE APPROXIMATE LEFT AND RIGHT ENDS OF THE NEXT FILLER RUN :
6150  INCL=FILN*TANL+RNDL
      IAL=IXL1+INCL
```

```
            INCR=FILN*TANR+RNDR
            IAR=IXR1+INCR
C     INSERT THE APPROXIMATE LEFT AND RIGHT ENDS INTO THE NEXT FILLER RUN
C     STACK ENTRY :
 6160 ISTK(K1)=AND(ISTK(K1),IKON3)+IAL*1024+IAR
C     UPDATE THE NUMBER OF FILLER RUNS :
 6165 FILN=FILN+1.
      GO TO 6140

C
C**** GENERATE THE FILLER STACK ENTRIES USING NON-LINEAR INTERPOLATION :
C
C     IS THE NUMBER OF LEFT STEPS GREATER THAN THE NUMBER OF DOWN STEPS
C     IN GOING FROM SPINE 1 TO SPINE 2 ?
16110 IF(IABS(IXL1-IXL2).GT.KFILL+1) GO TO 16115
C     THE NUMBER OF LEFT STEPS IS LESS THAN OR EQUAL TO THE NUMBER
C     OF DOWN STEPS :
C     SET THE NUMBER OF TIMES A LEFT INCREMENT OF 1 IS TO BE USED TO
C     1 LESS THAN THE ABSOLUTE DIFFERENCE BETWEEN THE LEFT ENDS OF
C     SPINE 1 AND SPINE 2 :
      LONEL=IABS(IXL1-IXL2)-1
C     SET THE NUMBER OF TIMES A LEFT INCREMENT OF 0 IS TO BE USED TO
C     THE NUMBER OF FILLER RUNS LESS THE NUMBER OF TIMES A LEFT
C     INCREMENT OF 1 IS TO BE USED :
      LZEROL=KFILL-LONEL
      GO TO 16120
C     THE NUMBER OF LEFT STEPS IS GREATER THAN THE NUMBER OF DOWN STEPS :
C     SET THE NUMBER OF TIMES A LEFT INCREMENT OF 1 IS TO BE USED TO 1 :
16115 LONEL=1
C     SET THE NUMBER OF TIMES A LEFT INCREMENT OF 0 IS TO BE USED TO 0 :
      LZEROL=0
C     SET THE LEFT INCREMENT TO 1 OR -1 FOR THE LEFT END OF THE FILLERS
C     PROGRESSING TO THE RIGHT OR LEFT RESPECTIVELY :
16120 INCL1=1
      IF(IXL1.GT.IXL2) INCL1=-1
C     IS THE NUMBER OF RIGHT STEPS GREATER THAN THE NUMBER OF DOWN STEPS
C     IN GOING FROM SPINE 1 TO SPINE 2 ?
16125 IF(IABS(IXR1-IXR2).GT.KFILL+1) GO TO 16130
C     THE NUMBER OF RIGHT STEPS IS LESS THAN OR EQUAL TO THE NUMBER
C     OF DOWN STEPS :
C     SET THE NUMBER OF TIMES A RIGHT INCREMENT OF 1 IS TO BE USED TO
C     TO 1 LESS THAN THE ABSOLUTE DIFFERENCE BETWEEN THE RIGHT ENDS OF
C     SPINE 1 AND SPINE 2 :
      LONER=IABS(IXR1-IXR2)-1
C     SET THE NUMBER OF TIMES A RIGHT INCREMENT OF 0 IS TO BE USED TO
C     THE NUMBER OF FILLER RUNS LESS THE NUMBER OF TIMES A RIGHT
C     INCREMENT OF 1 IS TO BE USED :
      LZEROR=KFILL-LONER
      GO TO 16135
C     THE NUMBER OF RIGHT STEPS IS GREATER THAN THE NUMBER OF DOWN STEPS :
C     SET THE NUMBER OF TIMES A RIGHT INCREMENT OF 1 IS TO BE USED TO 1 :
16130 LONER=1
C     SET THE NUMBER OF TIMES A RIGHT INCREMENT OF 0 IS TO BE USED TO 0 :
      LZEROR=0
C     SET THE RIGHT INCREMENT TO 1 OR -1 FOR THE RIGHT END OF THE FILLERS
C     PROGRESSING TO THE RIGHT OR LEFT RESPECTIVELY :
16135 INCR1=1
      IF(IXR1.GT.IXR2) INCR1=-1
C     GET THE POINTER TO THE STACK POSITION OF THE NEXT FILLER RUN :
16140 K1=K1+MOD(ISTK(K1)/1048576,512)
C     IS THE NUMBER OF TIMES REMAINING THAT A LEFT INCREMENT OF 0 IS TO BE
C     USED EQUAL TO 0 ?
16145 IF(LZEROL.EQ.0) GO TO 16150
C     REDUCE THE NUMBER OF TIMES REMAINING THAT A LEFT INCREMENT OF 0
C     IS TO BE USED :
      LZEROL=LZEROL-1
      GO TO 16155
C     IS THE NUMBER OF TIMES REMAINING THAT A LEFT INCREMENT OF 1 IS TO BE
C     USED EQUAL TO 0 ?
16150 IF(LONEL.EQ.0) GO TO 6055
C     STEP THE LEFT INCREMENT :
      IXL1=IXL1+INCL1
C     REDUCE THE NUMBER OF TIMES REMAINING THAT A LEFT INCREMENT OF 1
C     IS TO BE USED :
      LONEL=LONEL-1
```

```
C      IS THE NUMBER OF TIMES REMAINING THAT A RIGHT INCREMENT OF 0 IS TO BE
C      USED EQUAL TO 0 ?
16155  IF(LZEROR.EQ.0) GO TO 16160
C      REDUCE THE NUMBER OF TIMES REMAINING THAT A RIGHT INCREMENT OF 0
C      IS TO BE USED :
       LZEROR=LZEROR-1
       GO TO 16165
C      STEP THE RIGHT INCREMENT :
16160  IXR1=IXR1+INCR1
C      INSERT THE APPROXIMATE LEFT AND RIGHT ENDS INTO THE NEXT FILLER RUN
C      STACK ENTRY :
16165  ISTK(K1)=AND(ISTK(K1),IKON3)+IXL1*1024+IXR1
       GO TO 6055
C
C****  BUILD THE NEXT APPROXIMATED PICTURE LINE LNB FROM THE STACK ENTRIES :
C
C      SET THE SIGNAL FOR THE FIRST LINE IN THE STACK SEGMENT :
 6200  LSIG=0
C      RESET THE STACK POINTER :
 6201  K=2
C      SET THE POINTER TO THE STACK POSITION OF THE LINES WORD PLUS 1 :
 6202  KB=3
C      SET THE LINE LNB TO THE BACKGROUND LEVEL :
 6205  DO 6206 N=1,1024
 6206  LNB(N)=IBACK
C      SET THE TYPE OF THE PREVIOUS ITEM TO A FILLER :
 6210  ITYPP=0
C      SET THE RIGHT END OF THE PREVIOUS ITEM TO NEGATIVE :
 6215  IXRP=-1
C      UPDATE THE STACK POINTER :
 6225  K=K+1
C      IS THIS THE END OF THE CURRENT STACK SEGMENT ?
 6230  IF(K.GT.NSTK+1) GO TO 6500
C      IS THE NEXT ITEM ON THE STACK A NEW LINE ITEM ?
 6235  IF(ISTK(K).LT.0) GO TO 6500
C      GET THE GRAY LEVEL OF THE NEXT ITEM :
 6240  IGL=ISTK(K)/2147483648
C      IS THE GRAY LEVEL OF THE NEXT ITEM EQUAL TO THE BACKGROUND LEVEL ?
 6245  IF(IGL.EQ.IBACK) GO TO 6225
C      GET THE LEFT AND RIGHT ENDS OF THE NEXT ITEM :
 6250  IXL=MOD(ISTK(K)/1024,1024)
       IXR=MOD(ISTK(K),1024)
C      GET THE TYPE OF THE NEXT ITEM :
 6260  ITYP=AND(ISTK(K),IKON4)
C      IS THE NEXT ITEM A FILLER ?
 6270  IF(ITYP.EQ.0) GO TO 6400
C      IS THE NEXT ITEM A REMOVED HEAD OR TAIL RUN ?
 6271  IF(ITYP.EQ.IKON4) GO TO 6225
C
C****  THE NEXT STACK ITEM IS AN EXACTLY ENCODED RUN :
C
C      ENTER THE EXACTLY ENCODED RUN IN THE APPROXIMATION LINE LNB :
 6275  JXL=IXL+1
       JXR=IXR+1
       DO 6276 N=JXL,JXR
 6276  LNB(N)=IMAGE
C      IS THE LEFT END OF THE EXACTLY ENCODED RUN AT THE LEFT END
C      OF THE PICTURE ?
 6280  IF(IXL.EQ.0) GO TO 6290
C      SET THE PEL TO THE LEFT OF THE LEFT END OF THE EXACTLY ENCODED RUN EQUAL
C      TO THE BACKGROUND LEVEL :
 6285  LNB(IXL)=IBACK
C      IS THE RIGHT END OF THE EXACTLY ENCODED RUN AT THE RIGHT END
C      OF THE PICTURE ?
 6290  IF((IXR+1).EQ.NSAM) GO TO 6300
C      SET THE PEL TO THE RIGHT OF THE RIGHT END OF THE EXACTLY ENCODED
C      RUN EQUAL TO THE BACKGROUND LEVEL ?
 6295  LNB(IXR+2)=IBACK
C      IS THE EXACTLY ENCODED RUN THE FIRST ONE IN THE BLOB ?
 6300  IF(ITYP.NE.IKON1) GO TO 6390
C
C****  THE NEXT STACK ITEM IS THE FIRST EXACTLY ENCODED RUN IN THE BLOB :
C
```

```
C     ARE THE HEAD AND TAIL RUNS TO BE APPROXIMATED ?
6301  IF(ISNOW.EQ.0) GO TO 6390
C     IS THIS THE FIRST LINE IN A STACK SEGMENT ?
6305  IF(LSIG.EQ.0) GO TO 6390
C     ARE THERE ANY HEAD AND TAIL APPROXIMATION PELS LEFT ?
6310  IF(NSNOW.LE.0) GO TO 6390
C
C**** ATTEMPT TO GENERATE AN APPROXIMATE HEAD IN THE LINE LNA :
C
C     IS THE LENGTH OF THE NEXT ITEM IN THE LINE LNB LESS THAN OR EQUAL TO
C     THE MAXIMUM LENGTH FOR A SUBHEAD ?
6315  IF((IXR-IXL).GT.LENSNO) GO TO 6390
C     SET THE LEFT END OF THE APPROXIMATED HEAD EQUAL TO ITS EXTREME LEFTMOST
C     POSSIBLE POSITION, WHICH IS THE LEFT END OF THE NEXT ITEM PLUS THE LEFT
C     APPROXIMATION INCREMENT :
6320  ISL=IXL+INL
C     SET THE RIGHT END OF THE APPROXIMATED HEAD EQUAL TO ITS EXTREME RIGHTMOS
C     POSSIBLE POSITION, WHICH IS THE RIGHT END OF THE NEXT ITEM PLUS THE RIGH
C     APPROXIMATION INCREMENT :
6325  ISR=IXR+INR
C     IS THE LEFT END OF THE APPPROXIMATED HEAD TO THE RIGHT OF THE RIGHT
C     END OF THE APPROXIMATED HEAD ?
6330  IF(ISL.LE.ISR) GO TO 6335
C     SET THE LEFT AND THE RIGHT ENDS OF THE APPROXIMATED HEAD TO THE PEL
C     MIDWAY BETWEEN THE EXTREME LEFTMOST AND RIGHTMOST POSSIBLE POSITIONS :
6331  ISL=(ISL-ISR)/2+ISL
      ISR=ISL
C     IS THE LEFT END OF THE APPROXIMATED HEAD AT THE LEFT END OF THE PICTURE
6335  IF(ISL.EQ.0) GO TO 6355
C     IS THE PEL TO THE LEFT OF THE APPROXIMATED HEAD IN THE LINE LNA EQUAL
C     TO THE BACKGROUND LEVEL ?
6340  IF(LNA(ISL).EQ.IBACK) GO TO 6355
C     SET THE LEFT END OF THE APPROXIMATED HEAD 1 TO THE RIGHT :
6345  ISL=ISL+1
C     IS THE LEFT END OF THE APPPROXIMATED HEAD TO THE RIGHT OF THE RIGHT
C     END OF THE APPROXIMATED HEAD ?
C     IF SO, DO NOT GENERATE AN APPROXIMATED HEAD.
6350  IF(ISL.GT.ISR) GO TO 6390
      GO TO 6340
C     IS THE RIGHT END OF THE APPROXIMATED HEAD AT THE RIGHT END OF
C     THE PICTURE ?
6355  IF((ISR+1).EQ.NSAM) GO TO 6370
C     IS THE PEL TO THE RIGHT OF THE APPROXIMATED HEAD IN THE LINE LNA EQUAL
C     TO THE BACKGROUND LEVEL ?
6356  IF(LNA(ISR+2).EQ.IBACK) GO TO 6370
C     SET THE RIGHT END OF THE APPROXIMATED HEAD 1 TO THE LEFT :
6360  ISR=ISR-1
C     IS THE RIGHT END OF THE APPROXIMATED HEAD TO THE LEFT OF THE LEFT END
C     OF THE APPROXIMATED HEAD ?
C     IF SO, DO NOT GENERATE AN APPROXIMATED HEAD.
6365  IF(ISR.LT.ISL) GO TO 6390
      GO TO 6356
C     ENTER THE APPPROXIMATED HEAD IN THE LINE LNA, AND UPDATE THE NUMBER OF
C     REMAINING HEAD AND TAIL APPROXIMATION PELS :
6370  JXL=ISL+1
      JXR=ISR+1
      DO 6371 N=JXL,JXR
      IF(LNA(N).EQ.IMAGE) GO TO 6371
      LNA(N)=IMAGE
      NSNOW=NSNOW-1
6371  CONTINUE
C     SAVE THE TYPE OF THE PREVIOUS ITEM :
6390  ITYPP=ITYP
C     SAVE THE RIGHT END OF THE PREVIOUS ITEM :
6395  IXRP=IXR
      GO TO 6225
C
C**** THE NEXT STACK ITEM IS A FILLER :
C
C     IS THE LEFT END OF THE FILLER ITEM AT LEAST 2 TO THE RIGHT OF THE
C     RIGHT END OF THE PREVIOUS ITEM IN LINE LNB ?
6400  IF(IXL.GE.IXRP+2) GO TO 6420
C     IS THE PREVIOUS ITEM AN EXACTLY ENCODED RUN ?
6405  IF(ITYPP.EQ.0) GO TO 6425
```

```
C     SET THE LEFT END OF THE FILLER ITEM 2 TO THE RIGHT OF THE RIGHT END OF
C     THE PREVIOUS ITEM :
6410  IXL=IXRP+2
C     IS THE LEFT END OF THE FILLER ITEM TO THE RIGHT OF THE RIGHT END OF
C     THE FILLER ITEM ?
6415  IF(IXL.GT.IXR) GO TO 6390
C     ENTER THE FILLER RUN IN THE LINE LNB :
6420  JXL=IXL+1
      JXR=IXR+1
      DO 6421 N=JXL,JXR
6421  LNB(N)=IMAGE
      GO TO 6390
C     SET THE LEFT END OF THE FILLER ITEM TO 1 PLUS THE MIDPOINT BETWEEN THE
C     LEFT END OF THE FILLER ITEM AND THE RIGHT END OF THE PREVIOUS ITEM :
6425  IXL=(IXRP-IXL)/2+1
C     IS THE LEFT END OF THE FILLER ITEM TO THE RIGHT OF THE RIGHT END OF
C     THE FILLER ITEM ?
C     IF SO, DO NOT GENERATE THE FILLER.
6430  IF(IXL.GT.IXR) GO TO 6390
C     SET THE PEL TO THE LEFT OF THE LEFT END OF THE FILLER ITEM IN THE LINE
C     LNB EQUAL TO THE BACKGROUND LEVEL :
6435  LNB(IXL)=IBACK
      GO TO 6420
C
C****  START THE PROCESSING FOR THE END OF THE LINE :
C
C     IS THIS THE FIRST LINE IN A STACK SEGMENT ?
6500  IF(LSIG.NE.0) GO TO 6510
C     CHANGE THE SIGNAL TO INDICATE FIRST LINE IN STACK SEGMENT IS PASSED :
6505  LSIG=1
      GO TO 6720
C     ARE THE HEAD AND TAIL RUNS TO BE APPROXIMATED ?
6510  IF(ISNOW.EQ.0) GO TO 6700
C     ARE THERE ANY HEAD AND TAIL APPROXIMATION PELS LEFT ?
6515  IF(NSNOW.LE.0) GO TO 6700
C
C**** ATTEMPT TO GENERATE THE APPROXIMATE TAILS IN THE PREVIOUS LINE LNA :
C
C     SEARCH FOR THE NEXT ITEM IN THE PREVIOUS LINE WHICH IS A LAST EXACTLY
C     ENCODED RUN IN A BLOB :
C
C     IS THE NEXT ITEM IN THE PREVIOUS LINE A REMOVED HEAD OR TAIL ?
6520  IF(AND(ISTK(KA),IKON4).EQ.IKON4) GO TO 6530
C     FOR THE NEXT ITEM IN THE PREVIOUS LINE, GET THE RELATIVE POINTER TO
C     THE SUCCEEDING RUN IN THE BLOB :
6521  ICON=MOD(ISTK(KA)/1048576,512)
C     IS THERE A SUCCEEDING RUN ?
6525  IF(ICON.EQ.0) GO TO 6540
C     UPDATE THE STACK POINTER TO THE NEXT ITEM IN THE PREVIOUS LINE :
6530  KA=KA+1
C     HAVE ALL THE ITEMS IN THE PREVIOUS LINE BEEN TESTED FOR A LAST
C     EXACTLY ENCODED RUN IN A BLOB ?
6535  IF(KA.EQ.KB-1) GO TO 6700
      GO TO 6520
C     GET THE LEFT AND RIGHT ENDS OF THE EXACTLY ENCODED LAST RUN IN A BLOB :
6540  IXL=MOD(ISTK(KA)/1024,1024)
      IXR=MOD(ISTK(KA),1024)
C     IS THE LENGTH OF THE NEXT ITEM LESS THAN OR EQUAL TO THE MAXIMUM
C     LENGTH FOR A SUBTAIL ?
6545  IF((IXR-IXL).GT.LENSNO) GO TO 6530
C     SET THE LEFT END OF THE APPROXIMATED TAIL EQUAL TO ITS EXTREME LEFTMOST
C     POSSIBLE POSITION, WHICH IS THE LEFT END OF THE NEXT ITEM PLUS THE LEFT
C     APPROXIMATION INCREMENT :
6550  ISL=IXL+INL
C     SET THE RIGHT END OF THE APPROXIMATED TAIL EQUAL TO ITS EXTREME RIGHTMOST
C     POSSIBLE POSITION, WHICH IS THE RIGHT END OF THE NEXT ITEM PLUS THE RIGHT
C     APPROXIMATION INCREMENT :
6555  ISR=IXR+INR
C     IS THE LEFT END OF THE APPPROXIMATED TAIL TO THE RIGHT OF THE RIGHT
C     END OF THE APPROXIMATED TAIL ?
6560  IF(ISL.LE.ISR) GO TO 6570
C     SET THE LEFT AND THE RIGHT ENDS OF THE APPROXIMATED TAIL TO THE PEL
C     MIDWAY BETWEEN THE EXTREME LEFTMOST AND RIGHTMOST POSSIBLE POSITIONS :
6565  ISL=(ISL-ISR)/2+ISL
      ISR=ISL
```

```
      IS THE LEFT END OF THE APPROXIMATED TAIL AT THE LEFT END OF THE PICTURE :
 6570 IF(ISL.EQ.0) GO TO 6595
      IS THE PEL TO THE LEFT OF THE APPROXIMATED TAIL IN THE LINE LNB EQUAL
      TO THE BACKGROUND LEVEL ?
 6575 IF(LNB(ISL).EQ.IBACK) GO TO 6595
      SET THE LEFT END OF THE APPROXIMATED TAIL 1 TO THE RIGHT :
 6580 ISL=ISL+1

C     IS THE LEFT END OF THE APPPROXIMATED TAIL TO THE RIGHT OF THE RIGHT
C     END OF THE APPROXIMATED TAIL ?
C     IF SO, DO NOT GENERATE AN APPROXIMATED TAIL.
 6590 IF(ISL.GT.ISR) GO TO 6530
      GO TO 6575
C     IS THE RIGHT END OF THE APPROXIMATED TAIL AT THE RIGHT END OF
C     THE PICTURE ?
 6595 IF((ISR+1).EQ.NSAM) GO TO 6615
C     IS THE PEL TO THE RIGHT OF THE APPROXIMATED TAIL IN THE LINE LNB EQUAL
C     TO THE BACKGROUND LEVEL ?
 6600 IF(LNB(ISR+2).EQ.IBACK) GO TO 6615
C     SET THE RIGHT END OF THE APPROXIMATED TAIL 1 TO THE LEFT :
 6605 ISR=ISR-1
C     IS THE RIGHT END OF THE APPROXIMATED TAIL TO THE LEFT OF THE LEFT END
C     OF THE APPROXIMATED TAIL ?
C     IF SO, DO NOT GENERATE AN APPROXIMATED TAIL.
 6610 IF(ISR.LT.ISL) GO TO 6530
      GO TO 6600
C     ENTER THE APPPROXIMATED TAIL IN THE LINE LNB, AND UPDATE THE NUMBER OF
C     HEAD AND TAIL APPROXIMATION PELS :
 6615 JSL=ISL+1
      JSR=ISR+1
      DO 6616 N=JSL,JSR
      IF(LNB(N).EQ.IMAGE) GO TO 6616
      LNB(N)=IMAGE
      NSNOW=NSNOW-1
 6616 CONTINUE
C     ARE THERE ANY HEAD AND TAIL APPROXIMATION PELS LEFT ?
 6625 IF(NSNOW.GT.0) GO TO 6530
C
C**** FINISH THE PROCESSING FOR THE END OF THE LINE :
C
C     WRITE OUT THE LINE LNA :
 6700 WRITE (02) (LNA(J),J=1,NSAM)
C     MOVE THE LINE LNB TO THE LINE LNA :
 6720 DO 6721 N=1,NSAM
 6721 LNA(N)=LNB(N)
C     IS THIS THE END OF THE CURRENT STACK SEGMENT ?
 6730 IF(K.LE.NSTK+1) GO TO 6750
C     HAS THE LAST LINE IN THIS STACK SEGMENT BEEN OUTPUTTED ?
 6735 IF(LAST.EQ.1) GO TO 6011
C     SET THE SIGNAL TO INDICATE THAT THE LAST LINE IS OUTPUTTED :
 6740 LAST=1
      GO TO 6700
C     UPDATE THE STACK POINTERS TO THE STARTING POSITIONS OF LINES LNA AND LNB
 6750 KA=KB
      KB=K+1
      GO TO 6205
C
C**** END OF JOB :
C
 6800 STOP
      END
```

What is claimed is:

1. Apparatus for encoding a two-dimensional graphic image comprising
   (A) means for generating an electrical signal representing successive scans of said graphic image,
   (B) means for sampling said electrical signal to derive samples of said signal, each sample representing a picture element (pel) of said two-dimensional scanned image,
   (C) means for associating ordered subsequences of said sequence of samples to define a plurality of like-valued geometrically related image areas (blobs),
   (D) means for extracting and storing electrical representations of values for each of a plurality of parameters for each of said blobs,
   (E) means for determining the relative frequency of each particular value for each of said parameters, and
   (F) means for assigning electrical code words to each of said parameter values in accordance with the relative frequency of occurrence of respective values of each of said parameters.

2. Apparatus according to claim 1 wherein said means for associating comprises
   (1) means for identifying subsequences of consecutive ones of said samples having the same value, and
(2) means for grouping one or more selected ones of said identified subsequences bearing a predetermined relation to each other.

3. Apparatus according to claim 2 wherein said means for grouping comprises means for grouping said identified subsequences corresponding to particular runs of pels on successive scan lines, each of said particular runs having left and right hand extreme positions along its scan line which do not differ from the left and right hand extreme position, respectively, of a run on an adjacent scan line by more than a predetermined number of pel positions.

4. Apparatus according to claim 1 wherein said means for extracting comprises means for determining the location of the beginning of each blob relative to one or more other blobs.

5. Apparatus according to claim 4 wherein said means for extracting further comprises means for determining the relative spacing between subsequences in a blob and means for determining the number of samples in the first subsequence in each blob.

6. Apparatus according to claim 1 wherein said means for assigning comprises
(1) means for generating a table of electrical codes (codebook) based on said relative frequencies for each of said parameters, said codebook comprising a code entry for each of a plurality of sets of said values for each of said parameters, and
(2) means for sequentially reading the parameter values for each blob and for sequentially storing the codebook entry for the set containing each parameter value read.

7. Apparatus according to claim 6 wherein said means for generating a codebook comprises means for generating a codebook entry for each value for said parameters.

8. Apparatus according to claim 6 wherein said means for generating a codebook comprises means for generating a codebook comprising Huffman code words.

9. Apparatus according to claim 6 wherein said means for generating comprises
(1) first and second means for generating electrical signals representing first and second additional frequency counts,
(a) said first means comprising means for dividing each original relative frequency count by a base B and means for counting the relative frequencies of the resulting integer multiples of B, and
(b) said second means comprising means for counting the relative frequencies of the positive remainders, each less than B, resulting from the division by said first means, and
(2) means for generating electrical code words for values for each of said multiples and quotients based on their respective relative frequencies.

10. Apparatus according to claim 1 wherein said means for assigning electrical code words comprises means for generating Elias code words.

11. Apparatus according to claim 1 wherein said means for assigning comprises
(1) means for determining which of a plurality of electrical code types is optional,
(2) means for generating a table of electrical codes (codebook) based on said optional code types and on said relative frequencies for each of said parameters, said codebook comprising a code entry for each of said values for each of said parameters, and
(3) means for sequentially reading the parameter values for each blob and for sequentially storing the codebook entry for each parameter value read.

12. Apparatus according to claim 1 further including means for storing said assigned electrical code words for subsequent utilization in regenerating said graphic image.

13. Apparatus according to claim 1 further including means for decoding said assigned electrical code words to regenerate said graphic image.

* * * * *